United States Patent
Vienneau et al.

(10) Patent No.: US 8,028,232 B2
(45) Date of Patent: Sep. 27, 2011

(54) IMAGE PROCESSING USING A HIERARCHY OF DATA PROCESSING NODES

(75) Inventors: Christopher Vienneau, Montreal (CA); Juan Pablo Di Lelle, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 1261 days.

(21) Appl. No.: 10/619,758

(22) Filed: Jul. 15, 2003

(65) Prior Publication Data

US 2004/0051728 A1 Mar. 18, 2004

(30) Foreign Application Priority Data

Jul. 19, 2002 (GB) .................................. 0216844.1

(51) Int. Cl.
*G06F 3/00* (2006.01)
*G06F 3/01* (2006.01)

(52) U.S. Cl. ...................... 715/713; 715/716; 715/726

(58) Field of Classification Search .................. 715/713, 715/716, 760, 726; 345/474; 700/61

See application file for complete search history.

(56) References Cited

U.S. PATENT DOCUMENTS

| | | | | | |
|---|---|---|---|---|---|
| 5,825,944 | A | * | 10/1998 | Wang | 382/309 |
| 5,913,063 | A | * | 6/1999 | McGurrin et al. | 717/109 |
| 5,923,328 | A | * | 7/1999 | Griesmer | 715/854 |
| 6,028,602 | A | * | 2/2000 | Weidenfeller et al. | 715/781 |
| 6,055,515 | A | * | 4/2000 | Consentino et al. | 705/27 |
| 6,070,167 | A | * | 5/2000 | Qian et al. | 707/102 |
| 6,130,676 | A | * | 10/2000 | Wise et al. | 345/619 |
| 6,252,597 | B1 | * | 6/2001 | Lokuge | 715/841 |
| 6,271,846 | B1 | * | 8/2001 | Martinez et al. | 715/854 |
| 6,343,377 | B1 | * | 1/2002 | Gessner et al. | 717/171 |
| 6,496,208 | B1 | * | 12/2002 | Bernhardt et al. | 715/853 |
| 6,571,253 | B1 | * | 5/2003 | Thompson et al. | 707/103 R |
| 6,577,807 | B1 | * | 6/2003 | Yaegashi et al. | 386/52 |
| 6,633,308 | B1 | * | 10/2003 | Ono et al. | 715/723 |
| 6,714,201 | B1 | * | 3/2004 | Grinstein et al. | 345/474 |
| 6,717,596 | B1 | * | 4/2004 | Nason et al. | 715/788 |
| 6,750,890 | B1 | * | 6/2004 | Sugimoto | 715/838 |
| 6,868,525 | B1 | * | 3/2005 | Szabo | 715/738 |
| 6,983,420 | B1 | * | 1/2006 | Itou et al. | 715/723 |
| 6,993,773 | B2 | * | 1/2006 | Broussard | 719/328 |
| 2002/0047869 | A1 | * | 4/2002 | Takiguchi | 345/838 |
| 2002/0051005 | A1 | * | 5/2002 | Trinh et al. | 345/619 |
| 2002/0054112 | A1 | * | 5/2002 | Hasegawa et al. | 345/764 |
| 2002/0069218 | A1 | * | 6/2002 | Sull et al. | 707/501.1 |
| 2002/0075327 | A1 | * | 6/2002 | Stall | 345/853 |
| 2002/0112237 | A1 | * | 8/2002 | Kelts | 725/39 |
| 2002/0135621 | A1 | * | 9/2002 | Angiulo et al. | 345/838 |
| 2004/0125124 | A1 | * | 7/2004 | Kim et al. | 345/716 |
| 2005/0010876 | A1 | * | 1/2005 | Robertson et al. | 715/782 |
| 2006/0090141 | A1 | * | 4/2006 | Loui et al. | 715/764 |

FOREIGN PATENT DOCUMENTS

| | | |
|---|---|---|
| EP | 0718796 A2 | 6/1996 |
| EP | 0865001 A2 | 9/1998 |
| EP | 0899694 A1 | 3/1999 |
| EP | 969387 A2 * | 1/2000 |
| WO | WO 9917228 A1 * | 4/1999 |

* cited by examiner

*Primary Examiner* — Nicholas Augustine

(74) *Attorney, Agent, or Firm* — Gates & Cooper LLP

(57) ABSTRACT

A method of editing image data, wherein an image frame comprising a plurality of components is generated by processing a plurality of data processing nodes arranged in a hierarchical structure, said image frame is displayed to a user, said user manually selects one of said plurality of components for editing, a first data processing node considered to be appropriate to said component is selected and editing tools relevant to said first data processing node are displayed to said user.

32 Claims, 24 Drawing Sheets

| NODE ID | PARENT | CHILD | NODE TYPE | NODE DATA |
|---|---|---|---|---|
| 0001 | — | — | SCENE OUTPUT | ALL |
| 0002 | 0002:0016 | 0001 | KEYER | RGB |
| 0003 | 0003:0015 | 0002 | TRACKER | VECTOR |
| 0004 | 0004:0005 | 0003 | SUPPRESS | RGB |
| 0005 | 0005 | 0004 | FRAME | RGB |
| 0006 | — | — | TRACKER | VECTOR |
| 0007 | 0007:0010 | 0002 | SCALE | VECTOR |
| 0008 | 0008:0010 | 0006 | LIGHTING | LIGHT MAP |
| 0009 | 0009:0010 | 0007 | TEXTURE | BITMAP |
| 0010 | 0010 | 0008 | MODELER | 3D MODEL |
| 0011 | — | 0009 | SUPPRESS | RGB |
| 0012 | 0012 | 0002 | TEXTURE | BITMAP |
| 0013 | 0014:0015 | 0011 | TRACKER | VECTOR |
| 0014 | 0015 | 0002 | LIGHTING | LIGHT MAP |
| 0015 | — | 0013 | MODELER | 3D MODEL |
| 0016 | — | 0014 | MIXER | SOUND FILE |
| | | 0001 | | |

Figure 9

# IMAGE PROCESSING USING A HIERARCHY OF DATA PROCESSING NODES

BACKGROUND OF THE INVENTION

1. Field of the Invention

The present invention relates to processing image data defined by a hierarchical structure of data processing nodes.

2. Description of the Related Art

Many post production processes have been devised and employed over the years to enhance movie productions or video films with what is commonly referred to as "special effects". Such image enhancement have long been provided by means of using dedicated hardware, either as a scale model to be filmed and subsequently composited in post production or, more recently, by means of effects generators such as computer apparatus configured to output rendered image components to be also subsequently composited.

Technical advances in image processing systems have enabled the generalisation of the "blue screen" technique in video environments and "green screen" technique in cinematographic environments, whereby actors are filmed in a studio configured with blue or green saturated surroundings in order to generate a clip of foreground image frames. An alternative clip of background image frames is subsequently generated and a compositing process allows an editor to seamlessly blend the foreground and background image frames by means of keying part of the corresponding video signals, for instance the luminance or chrominance signal.

A problem inherent to the above image processing techniques was that effects generation could not take place in real-time, that is all of the various components in each image frame within a clip of such image frames would have to be shot in the case of real actors and/or situations committed to cinematographic film, or rendered in the case of computer graphics images, prior to the compositing process. Thus, if the appearance of any of such image components was artistically unsatisfactory, the only possible manner of remedying this problem would be to do another shot on new cinematagraphic film or amend parameters in the computer to generate a new version of the computer-rendered image components.

Modern image processing systems overcome the above problem by means of providing real-time image data processing capability, whereby every image component within an image frame exists as a hierarchical sub-structure of data processing nodes within a main structure, which thus defines the entire image frame. An image editor using such a modern image processing system can amend parameters and/or data in any of said data processing nodes to aesthetically improve any image component within an image frame and assess the effectiveness of his editing in real-time.

A problem has however developed within modern image processing systems as described above. As the size of modern movie image frames or high definition video image frames has dramatically increased, both in resolution and in the number of components therein, their corresponding structure of data processing nodes and further user-operable controls to edit the data and/or parameters of said nodes in said image processing systems has also grown. Indeed; conventional display devices of image processing systems can barely accommodate such image frames at full resolution, which often exceeds 2000 by 2000 pixels. Moreover, a structure of data processing nodes corresponding to any such image frame often includes hundreds or even thousands of such nodes, to the extent that the readability of such a structure becomes problematic from a user's point of view when displayed as an alternative to said image frame.

BRIEF DESCRIPTION OF THE SEVERAL VIEWS OF THE DRAWINGS

FIG. 9 further details the main structure shown in FIGS. 4, 7 and 8 in terms of hierarchically structured data processing nodes;

WRITTEN DESCRIPTION OF THE BEST MODE FOR CARRYING OUT THE INVENTION

Embodiments of the invention will now be described by way of example only with reference to the previously identified drawings.

FIG. 1

Figure 1:
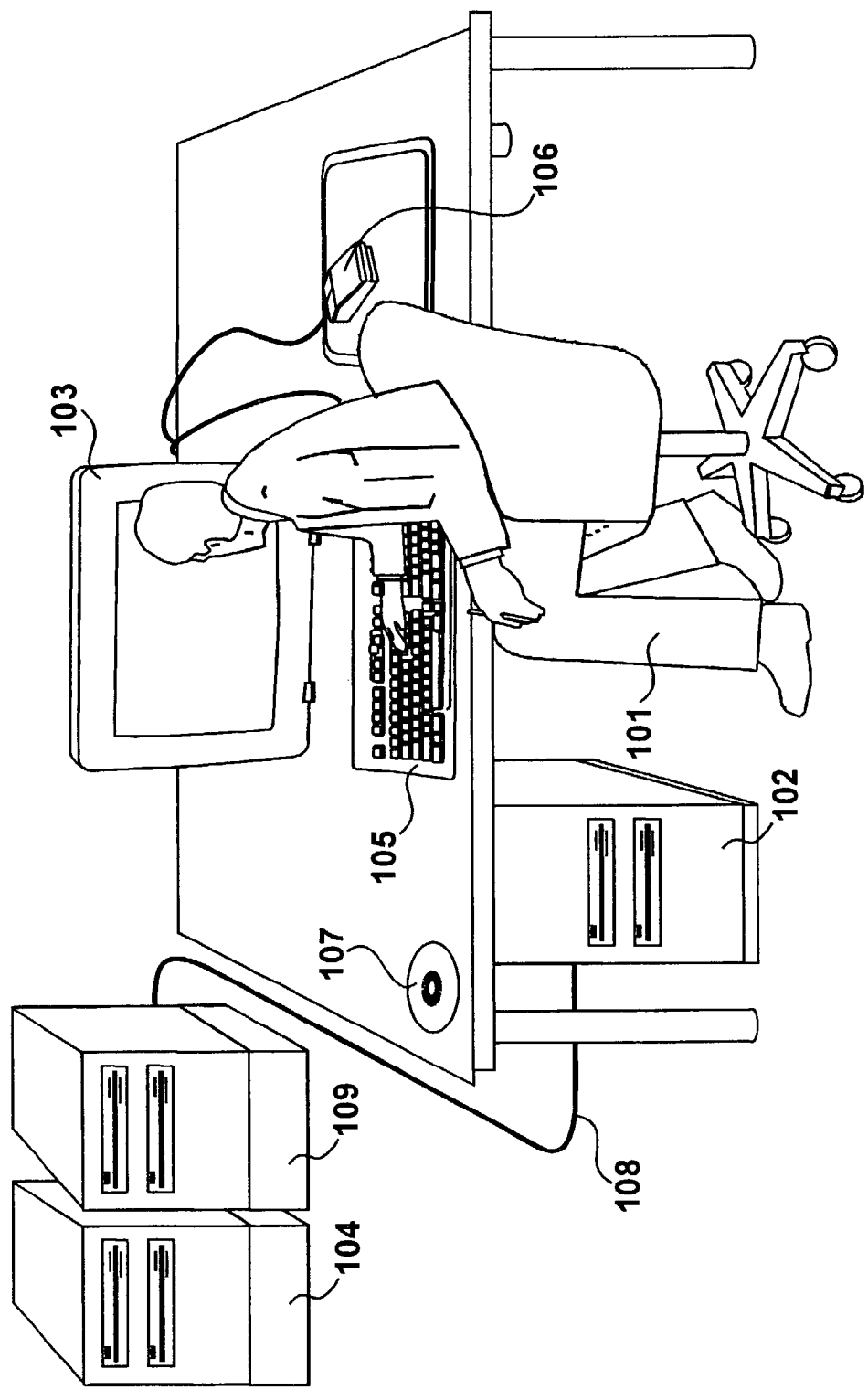
FIG. 1 shows an image processing system operated by an editor.

An image processing system such as a post-production station is illustrated in FIG. 1. A processing system 102, such as an Octane™ produced by Silicon Graphics Inc., supplies image signals to a display means, provided in this example by a video display unit 103. Moving image data is stored on storage means, provided in this example by a redundant array of inexpensive discs (RAID) 104. The RAID is configured in such a way as to store a large volume of data, and to supply this data at a high bandwidth, when required, to the processing system 102. The operator controls the processing environment formed by the processing system 102, the video monitor 103 and the RAID 104, by means of a keyboard 105, and a stylus-operated graphics tablet or a mouse 106. The processing system shown in FIG. 1 is optimal for the purpose of processing image and other high bandwidth data. In such a system, the instructions for controlling the processing system are complex. Any computer system where processing instructions are of significant complexity could be used.

Instructions controlling the processing system 102 may be installed from a physical medium such as a CDROM or DVD disk 107, or over a network 108, including the Internet. These instructions enable the processing system 102 to interpret user commands from the keyboard 105 and the graphics tablet 106, such that image data, and other data, may be viewed, edited and processed.

FIG. 2

Figure 2:
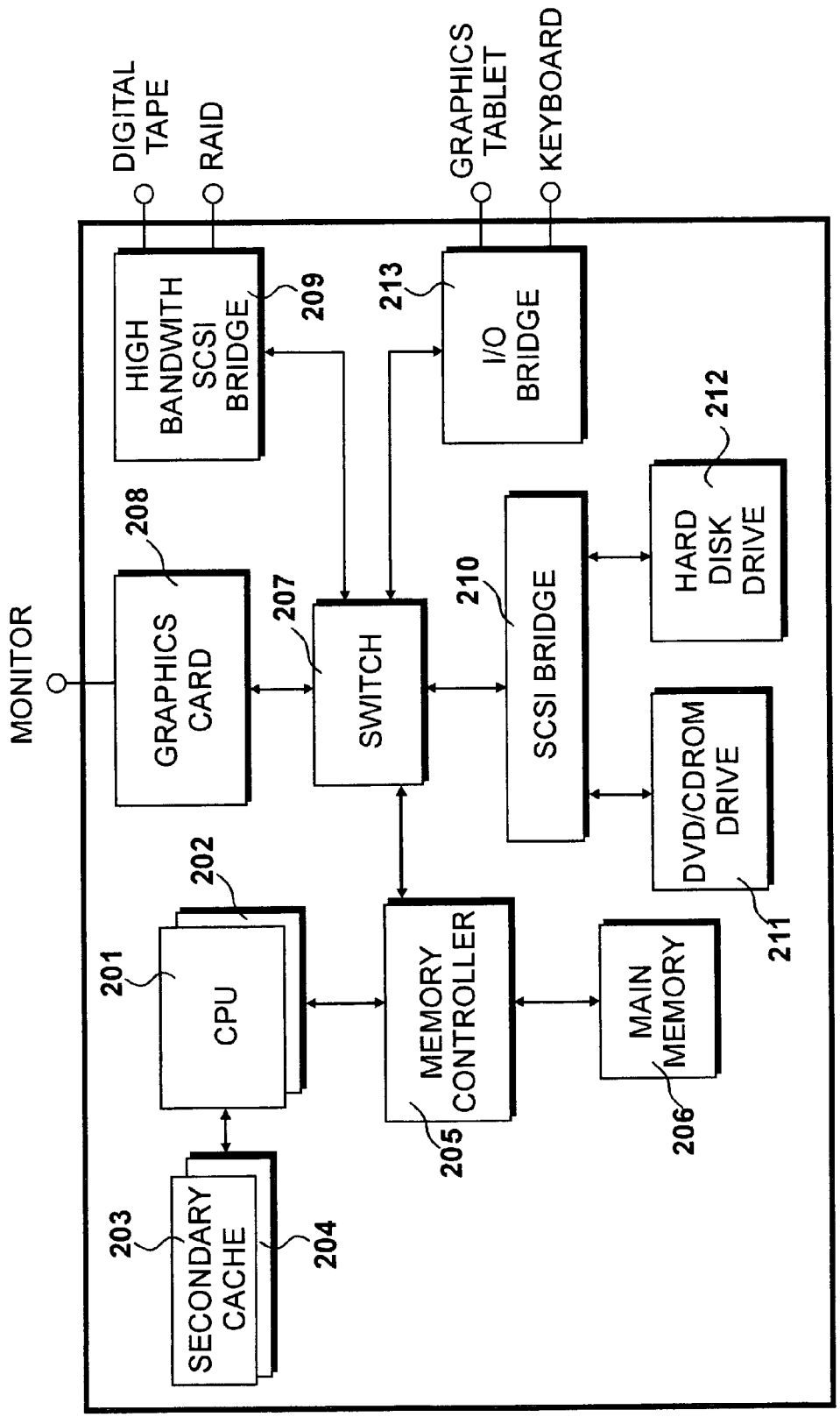
FIG. 2 details the hardware components of the image processing system of FIG. 1 in further detail.
Figure 3:
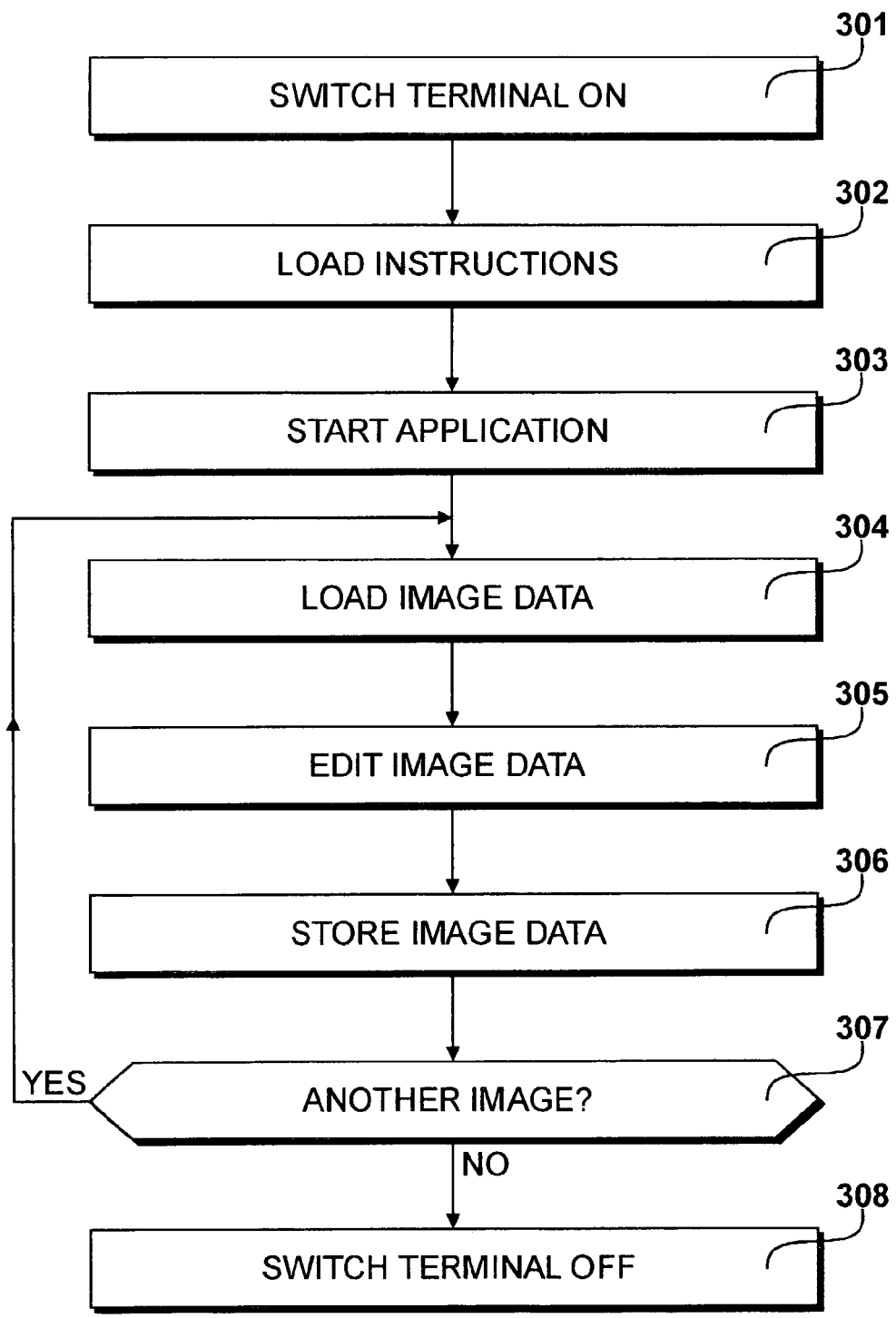
FIG. 3 details the operational steps according to which a user operates the image processing system of FIGS. 1 and 2.

The processing system 102 shown in FIG. 1 is detailed in FIG. 2. The processing system comprises firstly processing means, provided in this example by two central processing units (CPUs) 201 and 202 operating in parallel. Each of these processors is a MIPS R11000 manufactured by MIPS Technologies Incorporated, of Mountain View, Calif. Each of these processors 201 and 202 has a dedicated secondary cache memory 203 and 204 that facilitate per-CPU storage of frequently used instructions and data. Each CPU 201 and 202 further includes separate primary instruction and data cache memory circuits on the same chip, thereby facilitating a further level of processing improvement. A memory controller 205 provides a common connection between the processors 201 and 202 and a main memory 206. The main memory 206 comprises two gigabytes of dynamic RAM.

The memory controller 205 further facilitates connectivity between the aforementioned components of the processing system 102 and a high bandwidth non-blocking crossbar switch 207. The switch makes it possible to provide a direct high capacity connection between any of several attached circuits. These include a graphics card 208. The graphics card 208 generally receives instructions from the processors 201 and 202 to perform various types of graphical image rendering processes, resulting in images, clips and scenes being rendered in real time on the monitor 102. A high bandwidth SCSI bridge 209 provides an interface to the RAID 104, and also, optionally, to a digital tape device, for use as backup.

A second SCSI bridge 210 facilitates connection between the crossbar switch 207 and a DVD/CDROM drive 211. The DVD drive provides a convenient way of receiving large quantities of instructions and data, and is typically used to install instructions for the processing system 102 onto a hard disk drive 212. Once installed, instructions located on the hard disk drive 212 may be fetched into main memory 206 and then executed by the processors 201 and 202. An input output (I/O) bridge 213 provides an interface for the graphics tablet 106 and the keyboard 105, through which the user is able to provide instructions to the processing system 102.

FIG. 3

Processing system 102 is switched on by user 101 at step 301, such that CPU instructions may be permanently loaded onto hard disk drive 212 or temporarily loaded within main memory 206 from CD ROM or DVD ROM 107, network server 109 or the Internet 108.

Upon completing the loading operation of step 302 the application starts at step 303, whereby the instructions thereof are processed by CPUs 201 and 202. At step 304, image data from a single frame or, alternatively, from a clip of frames, is acquired from RAID 104 such that the frame or frames can be displayed to user 101 on video display unit 103 for subsequent editing at step 305.

Upon observing the frame displayed at step 304, user 101 is thus at liberty to modify any or all of the various components of the image data at step 305. The final edited image data may eventually be stored at frame store 104 upon completing the required level of image data editing.

At step 307, a question is asked as to whether the data for another image frame or another clip of image frames requires processing by image processing system 102, whereby control is returned to step 304 such that a new frame or clip of frames can be acquired from RAID 104 if answered in the affirmative. Alternatively, if the question asked at step 307 is answered in the negative then user 101 is at liberty to eventually switch the image processing system 102 off at step 308.

Figure 4:
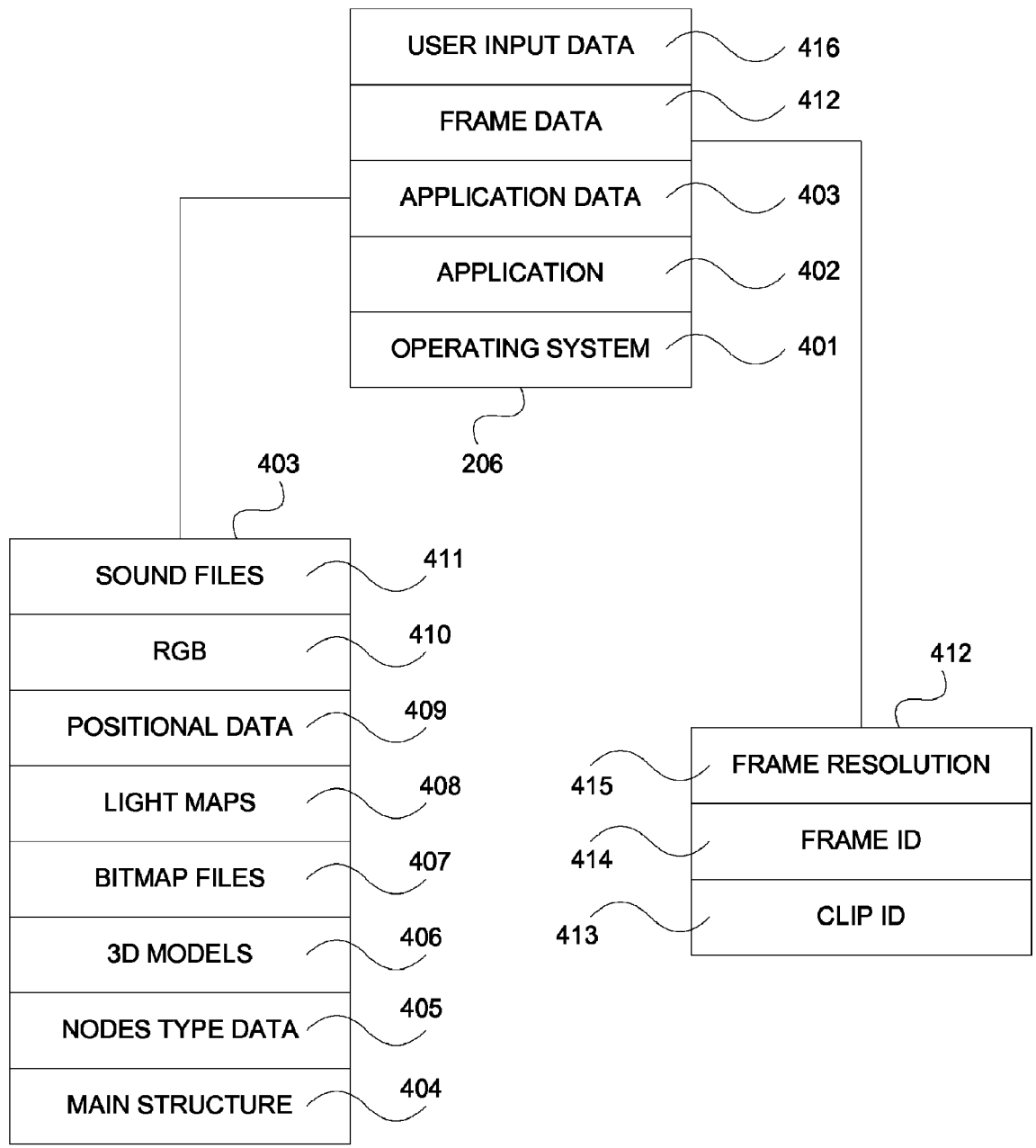
FIG. 4 shows the contents of the main memory shown in FIG. 2 subsequently to the instructions processing start shown in FIG. 3.

The contents of main memory 206 subsequent to the instruction processing of step 303 and image data acquisition of step 304 are further detailed in FIG. 4.

FIG. 4

An operating system is shown at 401 which comprises a reduced set of instructions for CPUs 201 and 202, the purpose of which is to provide image processing system 102 with basic functionality. Examples of basic functions include access to files stored on hard disk drive 212 or DVD/CD ROM drive 211 and management thereof, network connectivity with frame store 104, server 109 and the Internet 108, interpretation and processing of the input from keyboard 105 and graphic tablet or mouse 106 and graphical data or binary data output. In the example, the operating system is IRIX™ provided by Silicon Graphics Inc; but it will be apparent to those skilled in the art that the instructions herein described may be easily adapted to function under different other known operating systems, such as Windows™ provided by the Microsoft Corporation of Redmond, Calif. or LINUX which is freely distributed.

An application is shown at 402 which comprises the instructions loaded at step 302 that enable the image processing system 102 to perform steps 303 to 307 within a specific graphical user interface displayed on VDU 103.

Application data is shown at 403 and comprises various sets of user input-dependent data and user input-independent data according to which the application shown at 402 processes image data. Said application data primarily includes main structure data 404, which references the entire history of the image data as loaded at step 304 and comprehensively defines each component within an image frame in terms of hierarchically-structured data processing nodes, an example of which will be described further below. Accordingly, application data 403 also includes data 405 defining the various types of data processing nodes present within the structure or which may be inserted therein as a consequence of image data editing.

Further to the main structure data 404 and nodes definition data 405, application data 403 includes node data 406 to 411 to be processed in order to generate the current image frame, i.e. the parameters and data which, when processed by their respective data processing nodes generate the various components of said image frame.

In the example, node data comprises three-dimensional models 406 defined as a plurality of polygons or possibly non-uniform rational B-splines (NURBS). Node data also comprises bitmap files 407 to be applied as textures to said three-dimensional models 406 wholly or partially, and lightmaps 408.

Node data also comprises three-dimensional positional data 409, possibly in the form of vectors, to define scaling and tracking of said three-dimensional models 406 within a three-dimensional space. Node data also comprises RGB data 410 defining an image frame derived from film and digitally stored in RAID 104. Node data finally comprises sound files 411, for instance the portion of clip soundtrack corresponding to the image frame being edited. It will be easily understood by those skilled in the art that the above data types are for illustrative purposes only and the list described is non-exhaustive. Said data types relate to the type of data processing nodes required to define and generate the image frame components. There is currently a very large number of possibilities for data types, and in the future there may be an almost unlimited number.

Frame data is shown at 412, which comprises user input independent data defining image frames acquired from frame store 104. Each frame is defined by a ClipID 413 referencing a clip of frames and a FrameID 414 referencing a frame within said clip. Frame data 412 also includes frame resolution 415 indicating the frame size in terms of picture screen elements, known to those skilled in the art as pixels, such that application 402 may appropriately configure output data for display at full resolution.

Finally, user input data is shown at 416, which comprises user input dependent data identifying parameters and/or data input by user 101 by means of keyboard 105 and graphic tablet or mouse 106 for the purpose of editing the above image data.

FIG. 5

Figure 5:
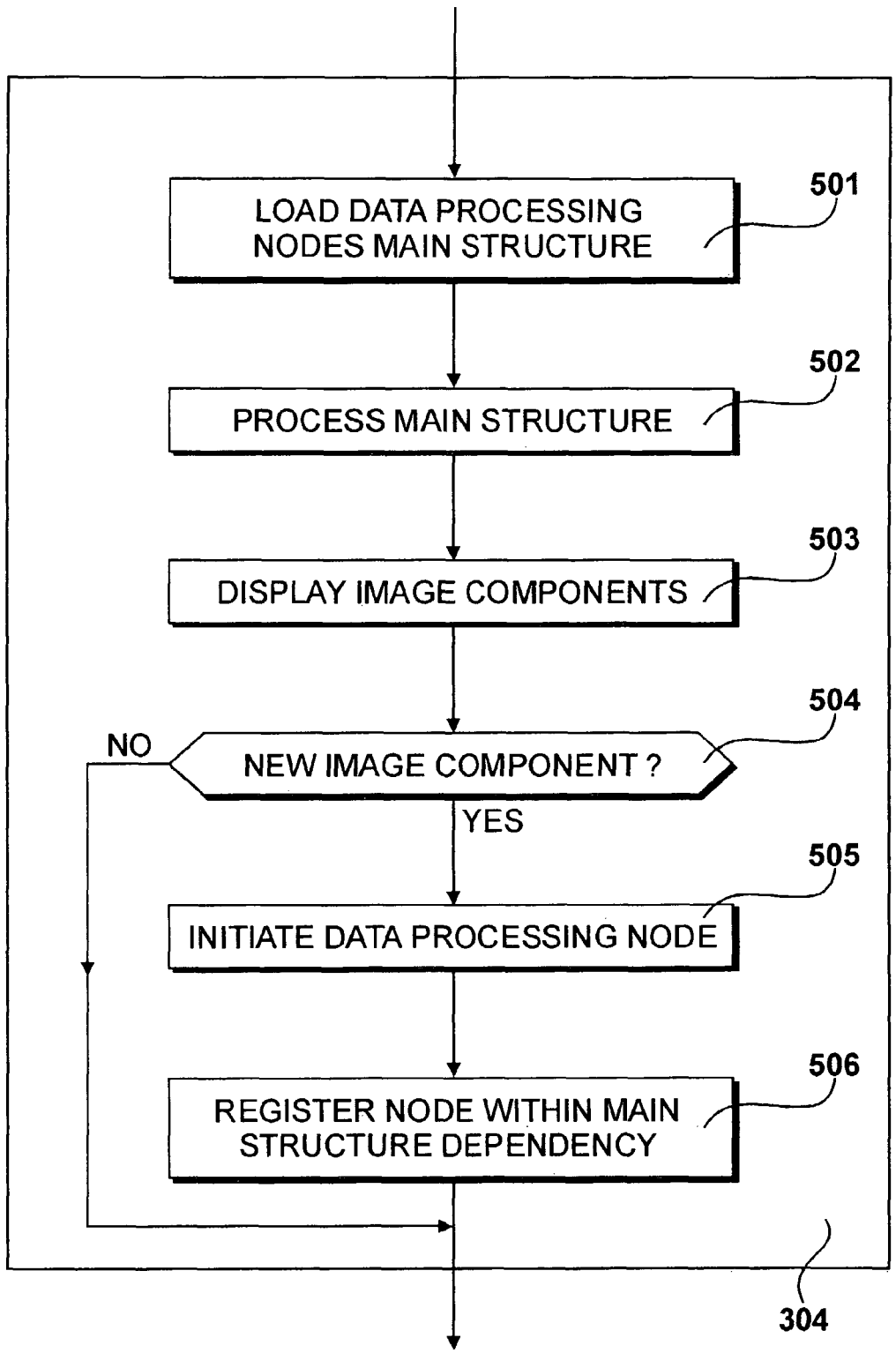
FIG. 5 details the loading and processing of image data as described in FIG. 4.

The loading and processing of image data as described in FIG. 4 at step 304 is further detailed in FIG. 5.

Initially the main structure 404 is loaded at step 501, whereby all of the data processing nodes are initiated, along with node type data 405 and node data 406 to 411. At step 502 said data processing nodes are processed according to the hierarchy defined by said main structure to generate image data, whereby all of the data processing nodes process their respective node data 406 to 411. The totality of image components defined by said main structure 404 is thus output to VDU display 103 as an image frame for user 101 to subsequently edit at step 503.

A question is asked at step 504 as to whether a new, node is required. User 101 may wish to impart some creative input to the image frame as it is currently defined, for instance by means of new visual effects or further components within the scene. If the question is answered in the affirmative, a data processing node is initiated at step 505.

In this embodiment, said node may either already have been initiated according to step 501 or may be a new type of application-compatible node loaded from CD ROM or DVD ROM 107 or network server 109 or downloaded from the Internet 108. Upon completing the initiation step 505, the new data processing node is registered within the main structure 404 at step 506, in terms of its dependency with regard to all of the other data processing nodes already referenced therein, a more detailed description of which will be provided further below. Alternatively, the question of step 504 is answered in the negative, whereby image data can now be edited according to step 305.

FIG. 6

Figure 6:
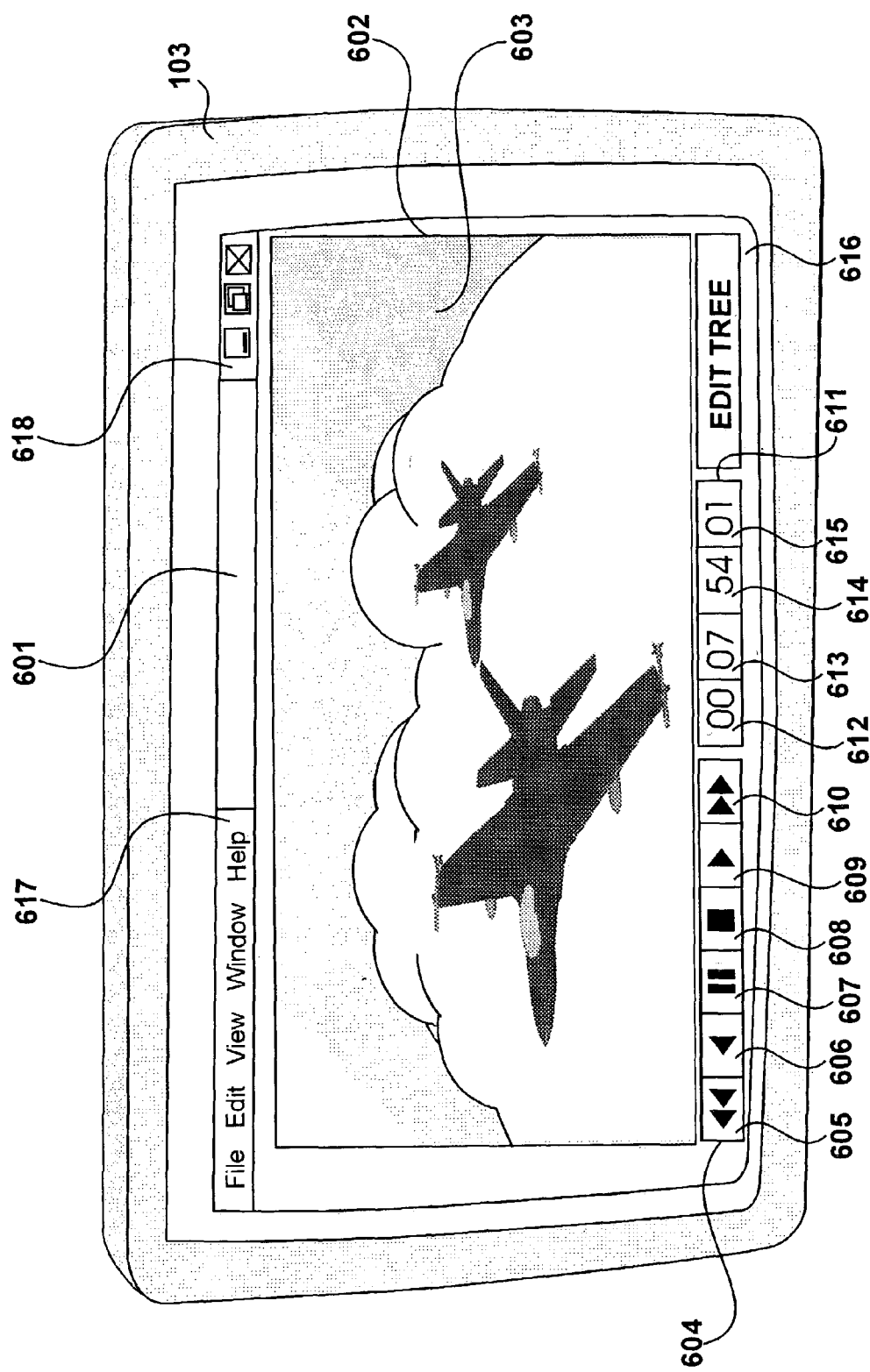
FIG. 6 shows the video display unit shown in FIG. 1 as displaying an image frame within the graphical user interface (GUI) of the application shown in FIGS. 4 and 5.

The image frame produced by generating image data according to step 502 for display according to step 503 is preferably output to the video display unit 103 of image processing system 102, within a Graphical User Interface (GUI), which is shown in FIG. 6.

The GUI 601 of application 502 is divided into a plurality of functional areas, portions of which are user-operable. A first area 602 displays image data 603 acquired at step 304. A second area 604 comprises user-operable conventional clip navigation widgets allowing user 101 to rewind 605, backward play 606, pause 607, stop 608, forward play 609 or fast-forward 610 the sequential order of image frames within a clip if user 101 acquired a clip at step 304.

A counter area 611 is provided in close proximity to area 602 and divided into an hour counter 612, minute counter 613, seconds counter 614 and frame counter 615, whereby said frame counter may operate in base twenty-four, base thirty or base sixty depending upon the provenance of the clip, eg respectively cinema, video or high definition TV. Said counter area 611 enables user 101 to accurately determine where the currently displayed image frame is located within the complete sequence of the clip.

A user-operable switch 616 is also provided within GUI 601, the manipulation of which by user 101, preferably but not exclusively via mouse 106, allows GUI 601 to alternatively display the image frame 603 or a graphical representation of the corresponding main structure 404 defining the components thereof.

A user-operable conventional bar 617 of menu commands is provided in the left uppermost area of GUI 601, which includes a plurality of shortcuts to facilitate frame or file access, application configuring and other such conventional application functions. A user-operable conventional bar 618 of GUI-sizing or application termination icons are provided in the right uppermost corner of 601. The skilled reader will understand that this is an example only of a suitable GUI and that any way of displaying the required information could be used.

In the example, user 101 acquires data 403 and 412 defining image frame 603 from RAID 104 according to step 304, whereby the components thereof are displayed in display area 602 of GUI 601 according to step 503.

FIG. 7

Figure 7:
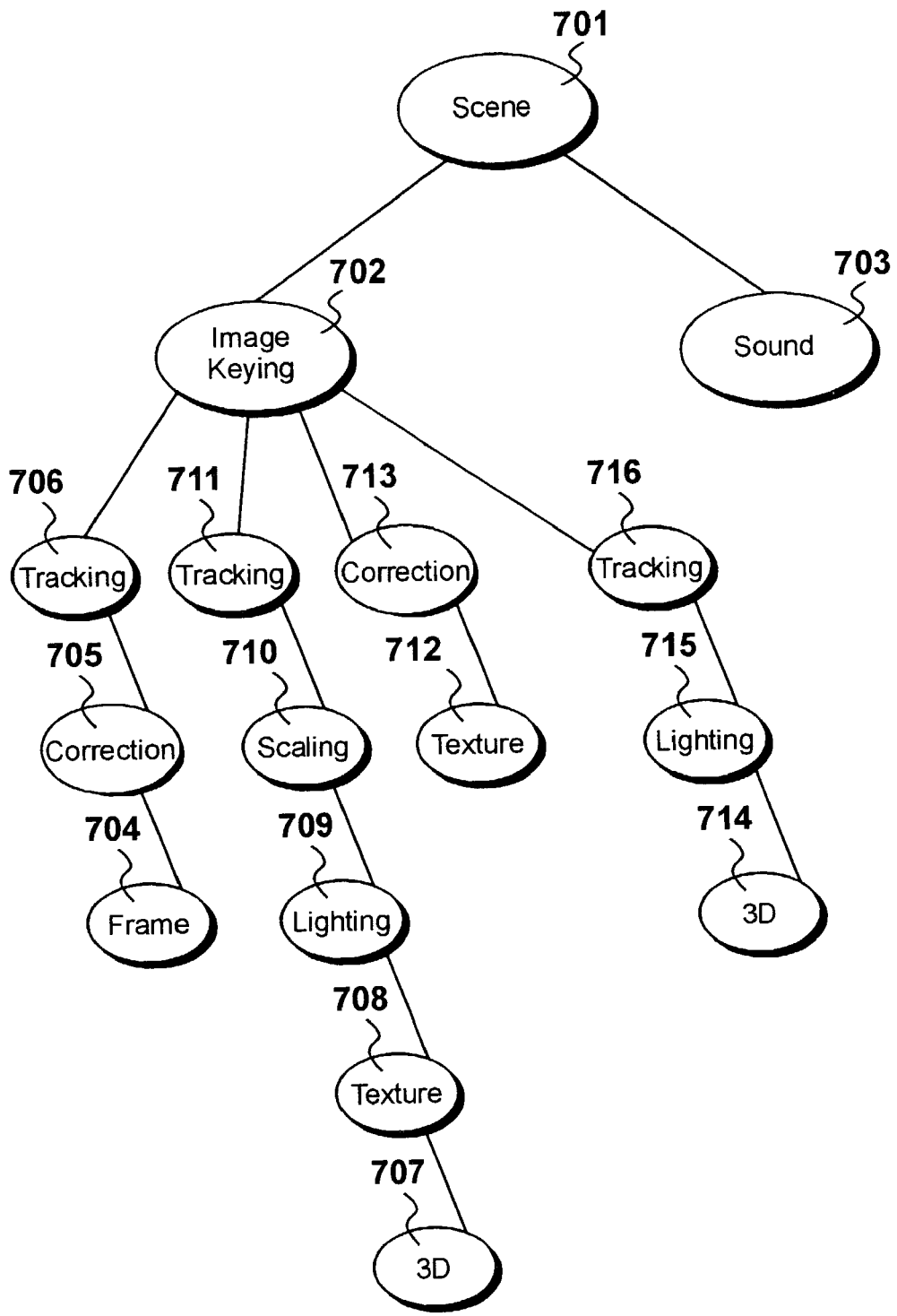
FIG. 7 shows a process tree as an example of the main structure shown in FIGS. 4 and 5.

A simplified example of a hierarchical structure 404 defining the components of image frame 603, also known to those skilled in the art as an edit decision list or process tree, is shown in FIG. 7.

A process tree consists of hierarchical, sequentially-linked data processing nodes, each of which specifies a particular processing task required in order to eventually achieve image data or scene output data 701, for instance under the form of frame 603. Traditionally, an output sequence 701 will comprise both visual data and audio data. Accordingly, the scene will thus require the output from an image-keying node 702 and the output of a sound mixing node 703. The image-keying node 702 calls on a plurality of further graphic data processing nodes to obtain all of the input data it requires to generate the desired image components. In effect, all of the nodes in the process tree define 'branches' of parent and children nodes and sub-divisions thereof and, insofar as the graphical nodes of the tree shown in FIG. 7 are concerned, each branch of nodes born from the ultimate graphical parent node 702 defines a layer. The purpose of image-keying node 702 is thus to composite the layers, e.g. superimpose the four layers shown in the example, which are further detailed below.

In the example, the desired output image frame includes a three-dimensional computer generated object composited with a background also consisting of a plurality of three-dimensional objects superimposed over a background texture.

The image-keying node 702 thus initially requires a frame as RGB data 410 from frame node 704, which is subsequently processed by a colour-correction processing node 705 and subjected to positional data 409 of a motion tracking processing node 706. The composited three-dimensional model 406 generated by three-dimensional modelling node 707, to which is applied a bitmap file 407 as a texture by the texturing node 708 and appropriate lightmap 408 by artificial light processing node 709, is scaled by scaling node 710 and also subjected to positional data 409 of a motion tracking processing node 711, such that it is seamlessly composited within the colour corrected frame 704.

In so far as, the background is concerned, the image keying processing node 702 also requires a uniform texture 407 from a texturing node 712, the functionality of which is similar to the texturing node 708, to which is applied the colour-correction of a colour-correction processing node 713, the functionality of which is similar to node 705. The image-keying processing node 702 finally overlays the plurality of simple three-dimensional models 406 generated from the three-dimensional modelling node 714, which are appropriately lit with lightmaps 408 by the artificial light processing node 715 and motion-tracked with positional data 409 by means of the motion-tracking processing node 716, over the colour corrected-texture 711 before overlaying the composited frame of node 704 on top of the composited background. The scene 701 is completed by associating the output of sound mixing node 703 with the output of image-keying node 702.

Thus the user sees a number of components making up the image frame. Each component is defined, by a number of nodes making up a layer. A hierarchical structure such as herein described can be considered to be made up of sub-structures, and in this example the sub-structure used is a layer. It will be noted that a layer may comprise further layers, for example the layer with node 702 as its top node includes the four layers described above. Thus it is possible for a sub-structure to be contained within another sub-structure, although in other embodiments the sub-structures may be discrete.

FIG. 8

It is common for process trees such as detailed in FIG. 7 to incorporate hundreds and even thousands of logically-linked data processing nodes configured as parent processing nodes and children processing nodes, each of which symbolises a functionality applied to some form of data or other.

Figure 8:
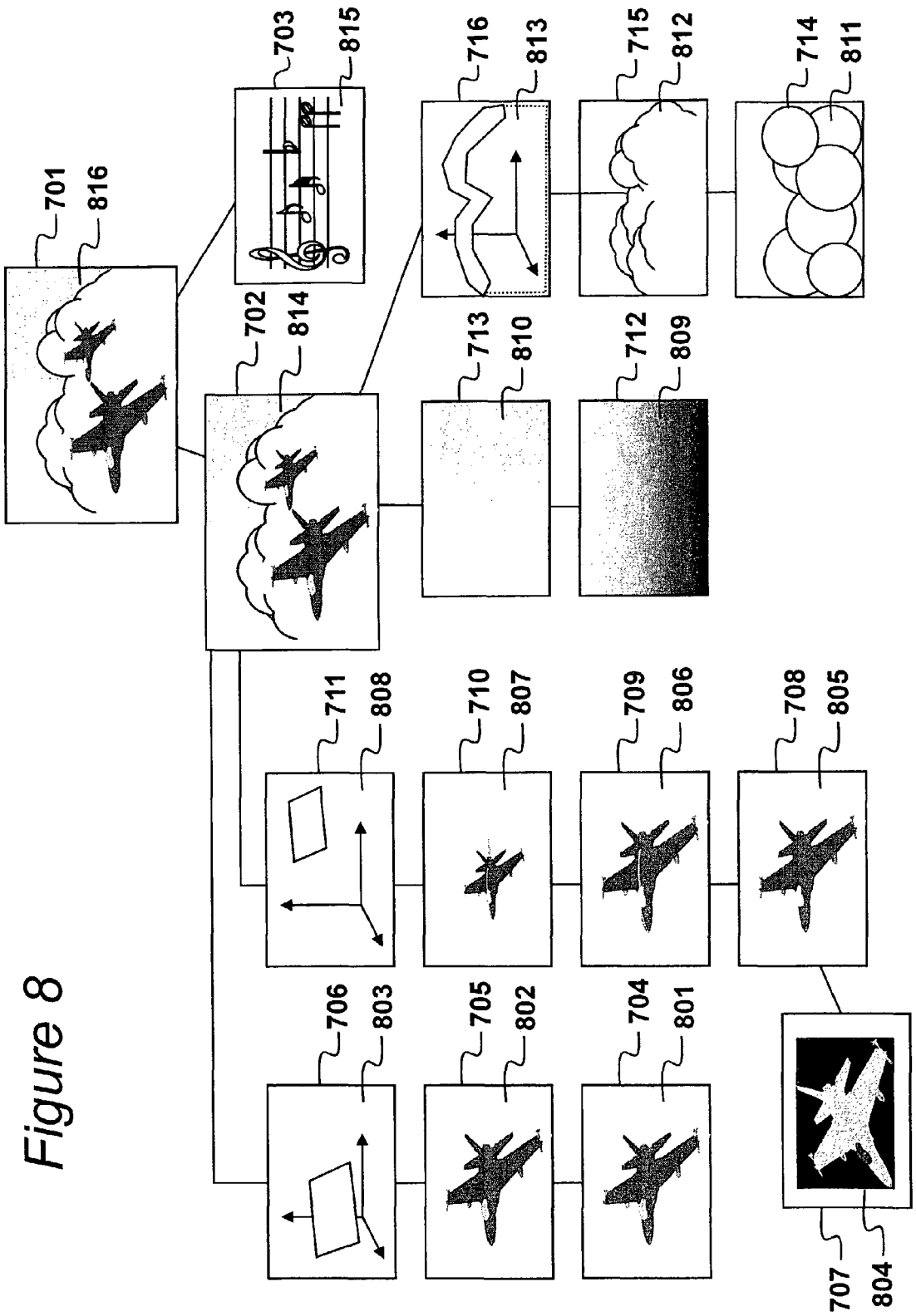
FIG. 8 provides a graphical representation of the data generated at each data processing node of the process tree shown in FIG. 7 when said processing nodes are processed.

The respective output data of each parent and child node 701 to 716 of the process tree detailed in FIG. 7 are graphically shown in FIG. 8 in order to illustrate the application data 403 processed at step 502.

The generation of all of the image components requires processing of all of the data processing nodes within the process tree. Said processing begins at the leftmost last child node 704, whereby an operational function of said child node 704 is invoked in order to fetch a frame 801, which depicts a real aeroplane photographed in front of a blue or green background in order to facilitate subsequent keying processes, depending upon whether the image was respectively shot for video or cinematography.

Node 705 is a parent node of node 704 and subsequently pulls the frame 801 from node 704, and its colour correction operational function modifies the colour 802 of said frame by applying a processing rule to the RGB values of every pixel in said frame. It is known to parent node 705 that frame 801 comprises a finite number of pixels corresponding to the resolution of frame 801 as the definition 412 of the frame is an array of pixels and its resolution 415 is for instance the number of pixels in a 24D high-definition cinematographic frame. The parent node 706 of node 705 subsequently pulls the data of said node and calls an operational function designed to orient the colour-corrected frame within a three dimensional volume 803.

The next layer depending from the parent node 702 is followed and thus proceeds to node 707, whereby a three dimensional computer generated model 406 of a plane is generated as component 804 by operational functions of said node 707. Its parent node 708 subsequently pulls said three-dimensional computer-generated model 804 in order to apply a "steel" bitmap texture 805 to each polygon of said three-dimensional model. It is known to node 708 that the three-dimensional model is composed of polygons defined by tessellating the smallest components of the model, which are vertices.

Processing node 709 subsequently applies an artificial lighting algorithm 408 at 806 to the textured three-dimensional model and processing node 710 can subsequently scale the lit (806), textured (805) three-dimensional model 804 at 807. The parent node 711 of node 710 subsequently pulls the data of said node and calls an operational function designed to animate the composited plane 807 within a three dimensional volume 808, known to those skilled in the art as motion-tracking.

With respect to the topmost graphical parent node 702 within the process tree, two further layers respectively defined by nodes 712, 713 and 714 to 716 have to be processed before it pulls the input data and processes said data itself. A "sky" bitmap texture 809 is thus generated by node 712 which is subsequently colour-corrected at parent node 713 using the same operational function as was invoked by colour-correction processing node 705 to process the frame 801.

Similarly, a computer-generated three-dimensional "clouds" model 811 is generated by node 714 utilising potentially the same operational function as was invoked by node 707 to generate the "plane" three dimensional model. The three-dimensional model 811 is subsequently lit (812) at parent node 715 using potentially the same lighting algorithm of the operational function called at node 709. The lit (812) three-dimensional model 810 is subsequently motion-tracked (813) at processing node 716 utilising the same operational functions invoked by processing nodes 706, 711 in order to eventually match the motion of the real and composited planes with the composited clouds.

Upon completing the processing 813 at node 716, the parent node 702 is thus able to pull all of the input data 801 to 813 and process it in order to generate a composite frame 814 comprising four components, within which two planes appear superimposed over a sky and clouds. Sound data 815 will then be processed by node 703, whereby output node 701 outputs the two components of final graphic data 814 and sound data 815 as an image frame 816.

FIG. 9

The main structure data 404 shown in FIG. 4 and further illustrated in FIG. 7 is shown in greater detail in FIG. 9 to better describe the hierarchical structure of data processing nodes it comprises. The hierarchy shown in FIGS. 7 and 8 is merely a way of displaying the nodes so that the parents and children of each node can be easily seen. However, the actual hierarchical structure is the table as shown in FIG. 9.

In this embodiment, each data processing node is referenced with a node ID 901 and is referenced as either a parent node 902, a child node 903 or a combination thereof, as the case may be. Each data processing node is further referenced by means of its type data 405 at 904 and its function-specific input data type 406 to 411 is similarly referenced at 905.

The main structure 404 shown in FIG. 9 takes the form of a database for illustrative purposes only, as it will be apparent to those skilled in the art that any other referencing structure providing for the hierarchical structuring of data processing nodes is suitable.

In this embodiment, the node ID 901 is generated during the first processing step 502 according to the processing order outlined in FIGS. 7 and 8, whereby the parent dependencies 902 and children dependencies 903 of each data processing nodes are generated and subsequently updated in real-time. Thus, in the example, the first node accessed at processing step 502 is the scene node 701 to which a node ID 906 is affixed. The next processing node accessed at said processing step 502 is data processing node 702 to which node ID 907 is affixed.

Data processing node 702 is a child node of data processing node 701, whereby the parent dependency 908 of said parent node 701 is updated and the child dependency 909 of said data processing node 702 is similarly updated.

Thus, for each subsequent data processing node sequentially accessed during said processing step 502, a new node ID is provided and the respective parent dependencies and child dependencies updated according to the principle outlined above, as are the corresponding node type 904 and node data type 905 populated, until such time as the entire main structure, or process tree, have been processed once. Preferably, one such processing cycle takes place within one thirtieth of a second.

FIG. 10

Figure 10:
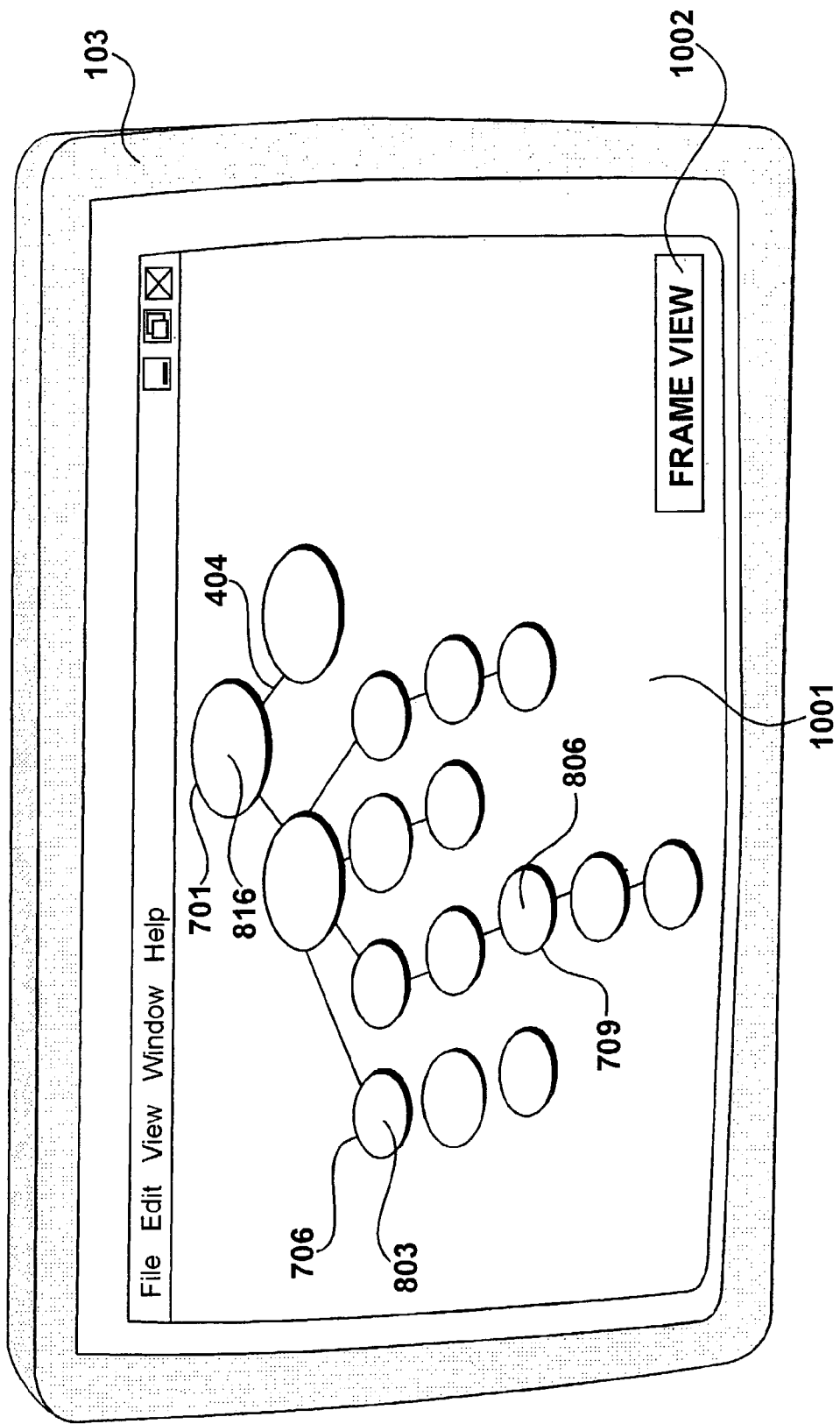
FIG. 10 shows the process tree shown in FIGS. 7, 8 and 9 within the GUI shown in FIG. 6 according to the prior art.

Upon completing the processing step 502 and thus the registration of the parent and children data processing nodes as shown in FIG. 9 in order to establish their hierarchy, image data processing system 102 can provide a depiction of the image frame 603 in terms of a hierarchy of data processing nodes, which is shown in FIG. 10.

In the example, user 101 provides first user input data 416 to the effect of activating user-operable switch 616, the processing of which instructs image data processing system 102 to alternate the display mode in display area 602 from frame display mode to structure display 1001, whereby said user operable switch 616 also alternates to user operable switch 1002 which, when activated, alternates said structure display 1001 back to frame display 602, wherein data processing nodes 701 to 716 are processed to display rendered image components according to steps 502, 503.

In the example, the activation of user operable switch 616 generates structure display 1001, whereby the entire main structure 404 is graphically depicted, thus including data processing nodes 701 to 716 as a hierarchical structure of logically-linked data processing nodes, preferably but not necessarily including a graphical representation of their corresponding respective output data 801 to 816.

Those skilled in the art will appreciate that the structure shown in FIGS. 7, 8 and 10 is herein kept to an overly simplistic scale for the purpose of clarity in the present description as compared to traditional structures comprising at the very least hundreds of such hierarchically structured data processing nodes. Consequently, they will be well aware of the inherent difficulty in intuitively and rapidly identifying a particular data processing node, the parameters and data of which require editing, for instance to remove artifacts visible in image frame 603, implement additional effects or components (such as adding a third plane) or, more generally, simply to adjust the overall appearance of image frame 603 for aesthetic reasons.

According to the prior art, in order to edit the process tree a user would be presented with the entire structure 404 defining image frame 603. User 101 would have to be familiar with the main structure 404 and its operating principle as described in FIGS. 7 and 8. Said user 101 would then have to identify the required data processing nodes from amongst all of said data processing nodes. Upon eventually identifying said relevant data processing node, said user would then select said node and amend the parameters or data thereof.

Thus, according to the known prior art, if user 101 needs to edit the positional data 409 processed by tracking node 711 in order to improve the motion of what is initially a three-dimensional model 804 within frame 603, user 101 would have to identify and subsequently select said node 711 within structure 404 as displayed in GUI area 1001.

Similarly, if user 101 needs to modify the artificial lighting applied to said model 804 at lighting node 709 using a light map 408, user 101 would need to identify and subsequently select said lighting node 709 within the main structure 404 as shown in GUI area 1001. It can, thus be appreciated that in an apparatus configured to the known prior art, or when using a method according to the known prior art, identifying and selecting a relevant data processing node from amongst hundreds or, more realistically, thousands of such logically-linked data processing nodes is unintuitive and time-consuming. It is even more difficult if the data is edited by a user who did not originally create it. Modern requirements for ever-more sophisticated effects applied to talents or environments or objects within a frame such as frame 603 compound the above problem, insofar as said effects require an ever increasing number of data processing nodes.

FIG. 11

This problem is remedied by providing a method of intuitively identifying and selecting any data processing node within main structure 404. The processing steps according to which image data is edited at step 305 are further detailed in FIG. 11.

In the example, user 101 is a post-production image editing specialist who wishes to improve the motion of the second background plane within frame 603, initially generated from a three-dimensional model 406 together with its artificial lighting generated from a light map 408. At step 1101 user 101 selects said second plane as an image component within image frame 603 within GUI 602, whereby corresponding first user input data 416 is received and image processing application 402 firstly identifies all of the data processing nodes as belonging to sub-structures, in this example layers, within main structure 404. First user input data 416 is then processed such that the image component of choice is selected at step 1102.

According to this embodiment of the invention, although user 101 actually selects any one of the plurality of data processing nodes the processing of which generates said second plane within image frame 603, it is irrelevant which specific data processing node within said sub-group is selected, since application 402 eventually selects the first data processing node at step 1103 within the sub-structure identified at step 1102.

In effect, at said step 1103 application 402 identifies the top node of only the layer defining the image component selected at step 1101, e.g. the first data processing node which defines a new layer or sub-structure after the keyer node 702. In the example, said last data processing node is tracking node 711. The fact that the tracking node has been selected is communicated to the user by displaying tools suitable for adjusting the tracking parameters of the selected component.

A question is asked at the next step 1104 as to whether navigation input data has been received, i.e. whether application 402 has received further user input data 416 indicative of a decision that the currently selected data processing node 711 is not the data processing node required for editing. In this embodiment, said navigation input data is provided by means of a specific keystroke on keyboard 105 or mouse button activation on mouse 106, but it will be apparent to those skilled in the art that any type of input device is appropriate to generate such navigation input data.

If the question of step 1104 is answered in the affirmative, a second question is asked at step 1105 as to whether the navigation input data received corresponds to linear navigating amongst parent and children nodes of a same layer, as first selected at step 1102. If this question is answered in the affirmative, the next data processing node in the sub-structure identified at step 502 is selected at step 1106 which, in the example, is the scaling node 710. A representation of the selected node is displayed to the user. Control is then returned to step 1104.

Alternatively, the question asked at step 1105 is answered in the negative, to the effect that the navigation input data corresponds to transversal navigating amongst compatible children nodes of a different layer, whereby said nodes are referred to as siblings in this embodiment. The user would input this data when he wishes to edit nodes referring to a different component. In this case a sibling is identified at step 1107 in a different sub-structure and control returned to question 1104, such that navigation within said different sub-structure and node selection therein is now possible. Again a representation of the selected node is displayed.

When the question asked at step 1104 is eventually answered in the negative, a third question is asked at step 1108 as to whether application 402 has received selection input data. Said selection input data is again user input data 416 but differs from the navigation input data of question 1104 in that it is processed by application 402 for updating application data 406 to 411 to be processed by the data processing node selected at step 502. Said selection input data is again read from keyboard 105 or mouse 106 or a combination thereof, but question 1108 is only answered in the affirmative if said input data differs from the pre-set navigation input data of questions 1104, e.g. input data read at question 1108 differs from the keystroke or mouse click input to effect navigation at question 1104.

Thus, when question 1108 is answered in the affirmative, the editing of parameters and/or data is initiated at step 1109 for the currently selected data processing node, and the edited image data may eventually be stored according to step 306. Alternatively, question 1108 is answered in the negative whereby the edited image data may immediately be stored according to step 306.

FIG. 11a

Figure 11:
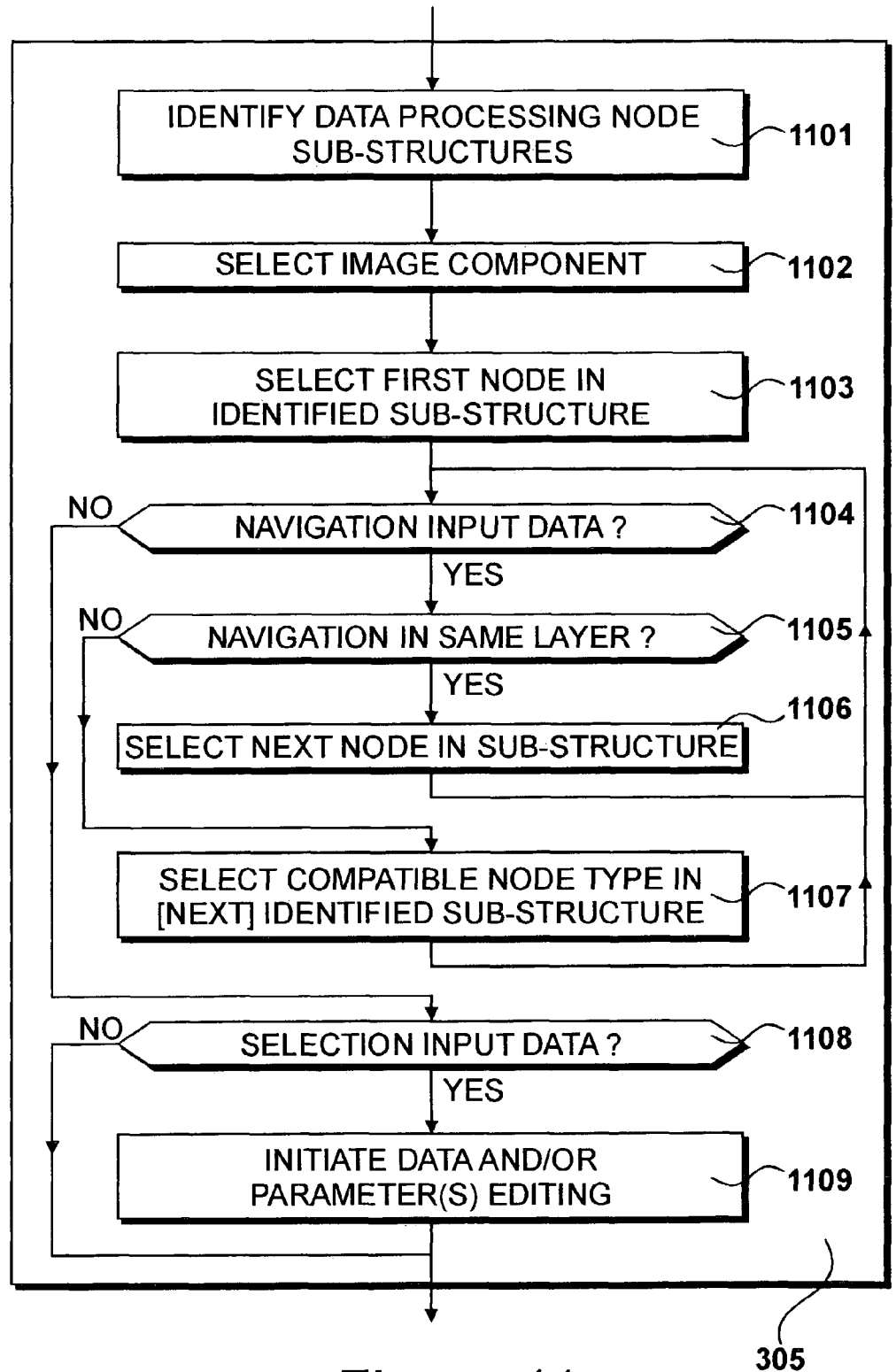
FIG. 11 details the operational steps according to which relevant image data is identified and edited.
Figure 11A:
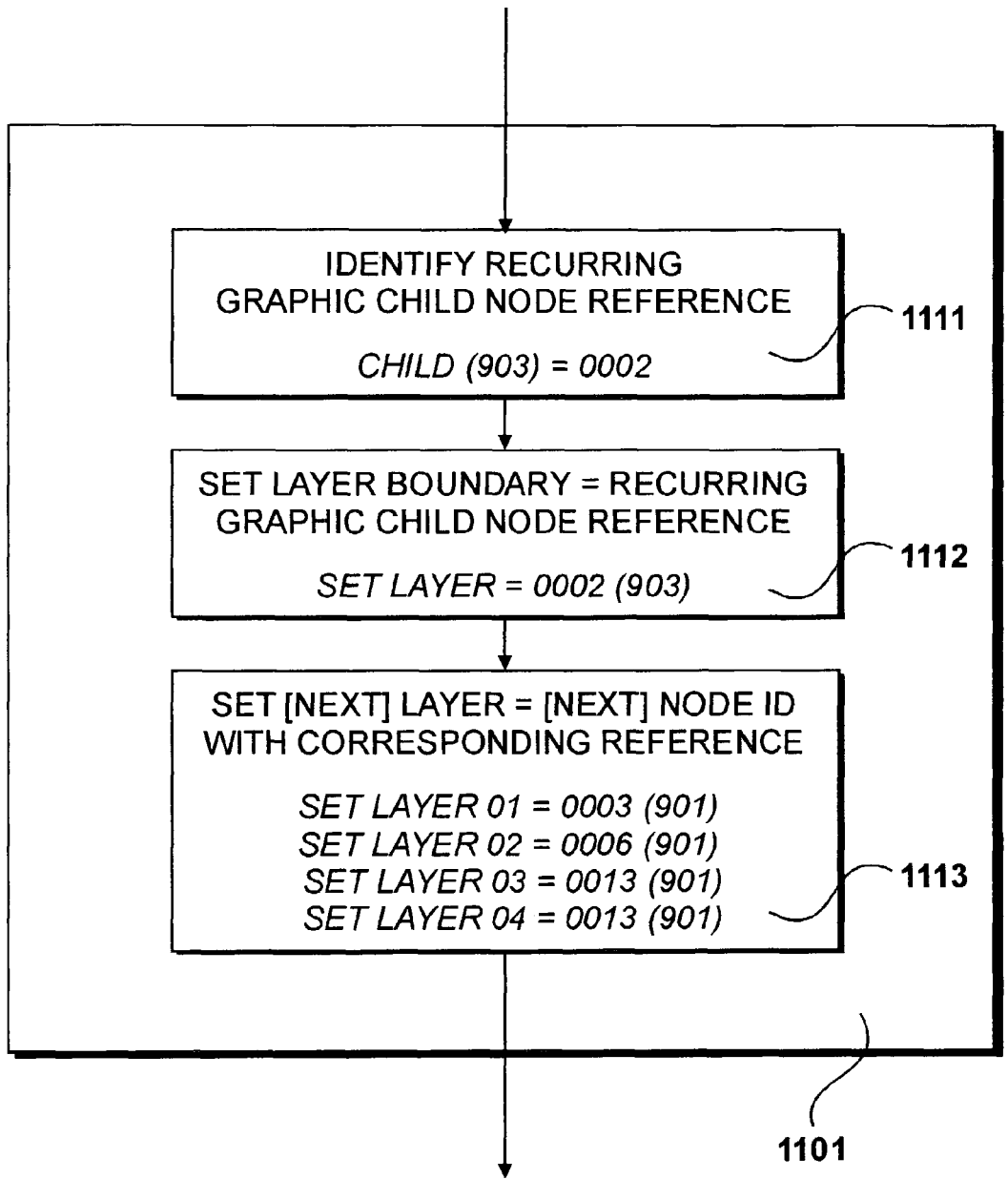
FIG. 11a details the operational steps according to which sub-structures of data processing nodes are identified.

The operational steps according to which, sub-structures of data processing nodes are identified at step 1101 are further described in FIG. 11a. At step 1111 recurring child node references are identified within the main structure as repeated occurrences of the dependency of data processing nodes on a parent data processing node. Thus, in the example, the first level of sub-structural division is based upon the dependency of image keying node 702 shown at 907 with a child node reference 909 and sound mixing node 703 with a node ID 901 equal to 0016 and an identical child node reference equal to 0001, respectively children of scene output node 701 shown at 906.

The next level of sub-structural division is obtained by identifying the recurring graphic child node reference 903 equal to 0002. Upon completing the above identification step, a boundary is set for each sub-structure, or layer, at step 1112 based upon said identified recurring graphic child node reference, whereby a precise identification of each substructure presence within main structure 404 is made possible and accomplished at step 1113. Referring back to FIG. 9, four substructures each defining a separate image component are identified, the respective first parent node of which are tracking node 706 (node ID 0003), tracking node 711 (node ID 0006), colour correction node 713 (node ID 0011) and tracking node 716 (node ID 0013).

FIG. 11b

Figure 11B:
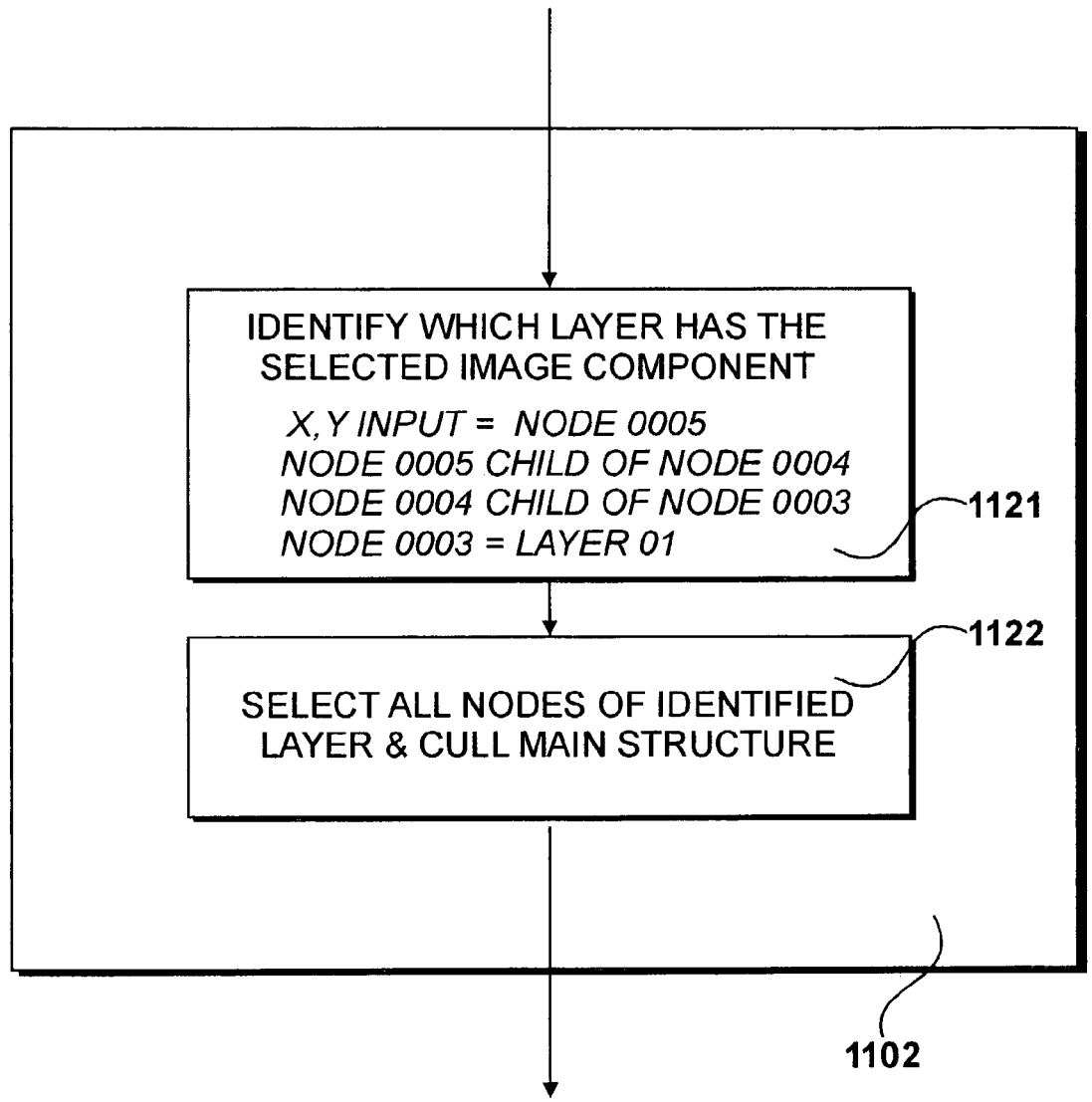
FIG. 11b details the operational steps according to which an image component is selected by means of its corresponding sub-structure.

The operational steps according to which an image component is selected by means of its corresponding sub-structure at step 1102 are further described in FIG. 11b. At step 1121, the x, y input data 416 read at step 1101 is processed in order to identify which sub-structure defines the selected image component. It was previously explained that the precise identification of a specific data processing node within the substructure is irrelevant as it is the ultimate parent node within the substructure which is eventually selected by means of processing the node's dependencies within said substructure. Thus, as the x, y input data 416 is processed to identify a specific node, its ultimate parent node is eventually identified as shown at 1121, wherein in the example the lighting node 709 (node ID 0008) is derived from said input data processing, its dependencies processed and its ultimate parent node tracking node 711 (node ID 0006) selected thus identifying the selected image component as belonging to layer 2. The selected node is therefore the top node of layer 2, which is node 711.

In this embodiment the top node of the layer defining the component is selected. This is because it is usually the last editing applied to the component and therefore the one the user is most likely to wish to, change or view. In alternative embodiments (not shown), however, another node in the layer could be selected. In particular a bottom node could be selected, which would represent the most basic part of the component. For example, in the current layer it would be node 707 that would be selected, This is the basic 3-D model of the plane and further upwards navigation from this point would show the order in which editing and effects are applied to that model. In more complicated process trees there is likely to be more than one bottom node to a layer and so possibly the first could be chosen. Alternatively, the last node above the start of another layer, within the selected layer could be chosen. The skilled reader will appreciate that the exact node considered appropriate to the component indicated by the user input could be any of the nodes in the layer, as long as the selection is consistent between components. For example, a user-defined setting in the application could define whether the top, bottom, or another node is to be selected.

FIG. 11c

Figure 11C:
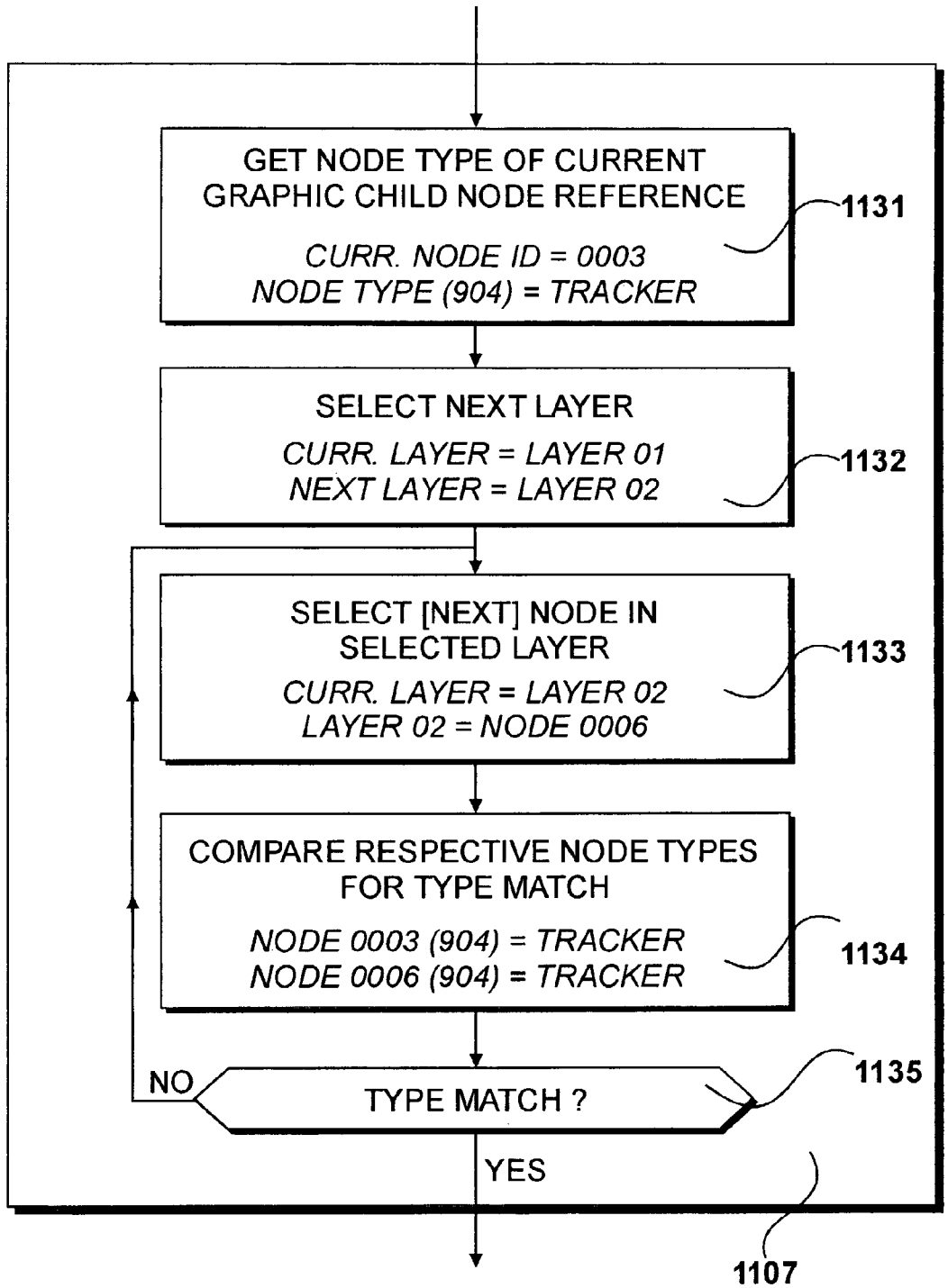
FIG. 11c details the operational steps according to which compatible data processing nodes are identified and selected in a different sub-structure.

The operational steps according to which compatible data processing nodes are identified and selected in a different sub-structure at step 1107 are further described in FIG. 11c. At step 1131, the node type 904 of the data processing nodes selected at step 1103 is read in main structure 404 and the next substructure is selected at step 1132, preferably by identifying the ultimate parent node of the current substructure and identifying the ultimate parent node of the next substructure.

At step 1133, the equivalent data processing node is selected in the new layer selected at step 1132, preferably by means of processing the same number of dependencies, whereby the respective node type 904 of the initial data processing node read at step 1131 and the sibling data processing node read at step 1133 are compared for type match at step 1134. A question is subsequently asked at step 1135 in order to determine if said respective node types 904 match. If the question of step 1135 is answered in the negative, the next dependent node will be selected at step 1133 for node type matching at step 1134, for instance, if various other functionalities are invoked by means of data processing nodes with a different node type between the substructure defining node and the sibling node in said next layer. The question of step 1135 is eventually answered in the affirmative, whereby control returns to the question of step 1105, e.g. whether navigation input data has been received or not.

FIG. 12

Figure 12:
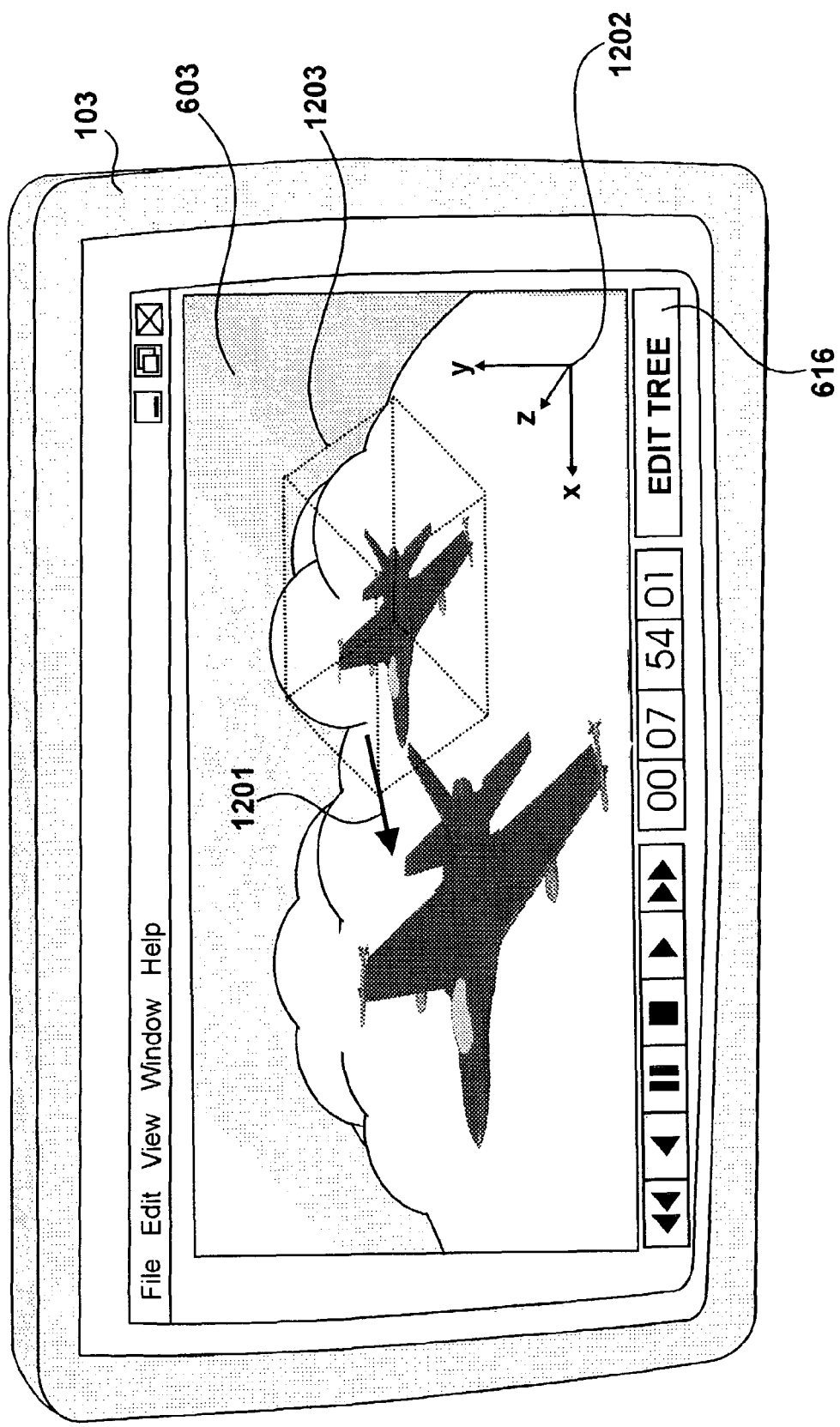
FIG. 12 shows the image frame within the graphical user interface (GUI) shown in FIG. 6.

The graphical user interface 601 of application 402 is shown in FIG. 12, wherein user 101 has selected the second aeroplane as an image component of image frame 603 according to step 1101.

In this embodiment, the data processing nodes 707, 708, 709 and 711 are identified at step 1101 as the sub-structure of nodes generating the second plane as an image component of image frame 603 and the tracking node 711 is selected as the ultimate processing node applied to said image component according to step 1103.

Consequently, until such time as application 402 receives either navigation input data, the effect of which would be to select the next node 710 within said sub-structure, or selection input data, the effect of which would be to initiate the editing of the current parameters and/or data of tracking node 711, an indication of said parameters and data specific to the functionality of the current selected node 711 is provided within image data 603. Said representation includes a vector 1201, the direction of which depicts the direction of travel of the plane within a reference, three-dimensional space 1202 and the length of which depicts the velocity of said plane.

A three-dimensional cubic volume 1203 encompasses the plane within said three-dimensional reference space 1202 to depict more intuitively the offset angle between the relative floor of space 1202 as defined by axes x and z and the wing span of the three-dimensional model corresponding to said plane.

Navigation user input data may now be provided as an answer to question 1104, preferably within the same sub-structure as an answer to question 1105, whereby parameters and data combinations 1201 to 1203 specifically relating to the functionality of tracking node 711 would be replaced by a representation of parameters and data combinations specific to the next data processing structure 710, ie specific to the editing of parameters and/or data relating to the scaling of the plane within the reference three-dimensional space 1202 and so on and so forth until the process selects the last child node 707 within said sub-structure, whereby editing of parameters and/or data could for instance include the generation of a completely different type of plane as an alternative three-dimensional model 406.

Thus in addition to the image frame a representation of a selected node is displayed. Further examples below will show that there are many ways in which the selected node can be represented. These examples are not exhaustive. Additionally, in this example it is the node at the top of the selected layer that is represented, but clearly this is not mandatory. In an alternative embodiment a node at the bottom of the layer, that is a node without children, is selected. Also, if a different algorithm using a different type of sub-structure of the tree, ie not a layer as in this example, were used in another embodiment of the invention, the selection of node could be dependent upon this.

FIG. 13

Figure 13:
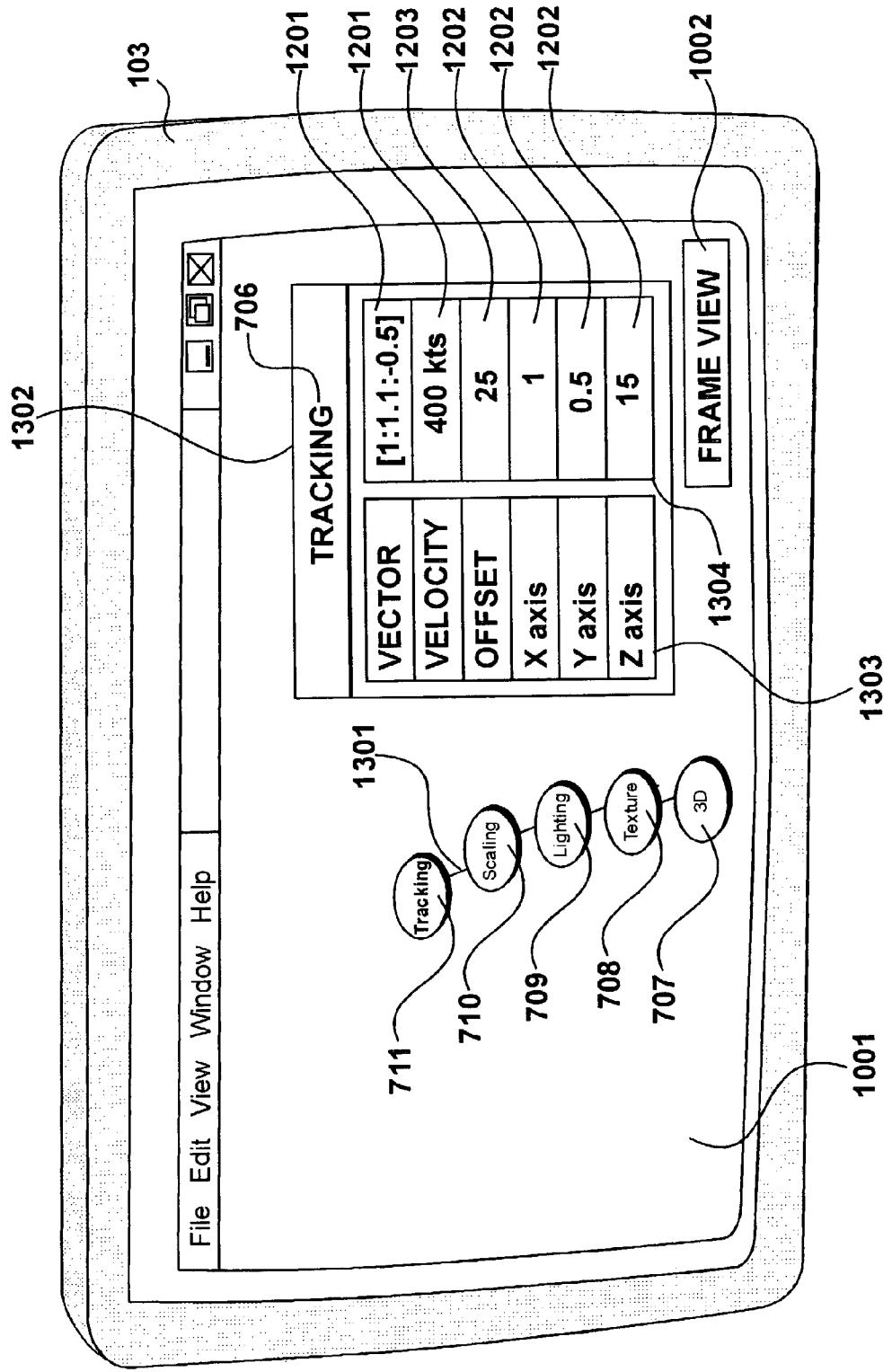
FIG. 13 shows the process tree shown in FIGS. 7, 8 and 9 within the GUI shown in FIG. 6.

The user 101 of image processing system 102 may prefer to edit the parameters and data graphically represented at 1201 to 1203 in more detail than can be perceived in GUI 601 as shown in FIG. 12, and thus application 402 may receive user input data 416 to the effect that the user operable switch 616 is activated such that the sub-structure of data processing nodes identified according to step 1102 is displayed within structure display area 1001. A graphical representation of said structure display area 1001 after said user input data is received is shown in FIG. 13.

In the example, user 101 selects the second plane as described in FIG. 12 but subsequently activates user operable switch 616 before inputting navigation input data according to question 1104 or selection input data according to question 1108, whereby frame display area 602 alternates to structure display area 1001 and said user operable switch 616 alternates to user operable switch 1002. The main structure 404 is culled according to step 1122 and the ultimate data processing node is selected in the sub-structure of data processing nodes defining said selected second plane, whereby only said sub-structure is graphically displayed at 1301, which only comprises data processing nodes 711 to 707 in accordance with the example previously described in FIG. 12.

The selected first data processing node 711 is highlighted such that image editor 101 is immediately made aware of which type of parameters and/or data he may initiate the editing of according to step 1109. Thus in this case the representation of a selected data processing node includes a depiction of a sub-structure of the hierarchy, in this example a layer, with the selected node indicated by highlighting. Said data processing node highlighting is provided here only as an example and it will be readily apparent to those skilled in the art that any other alternative providing a similar functionality is here envisaged.

Application 402 generates a display area 1302 for parameters and data, corresponding to said selected data processing node which in the example is tracking node 711. Depending upon the processing functionality provided by said selective node, said parameters and data display area 1302 may vary to a large extent. Preferably, area 1302 clearly identifies tracking node 711 by means of its corresponding node type data 405 referenced at 904, as well as its various parameters 1303 and parameter data 1304.

User 101 may input selection input data according to question 1108 within parameter data 1304, within which data corresponding to graphical representations 1201 to 1203 are shown for the purpose of clarity. Application 402 may at any time receive user input data 416 to the effect of either editing parameter 1303 or editing parameter data 1304, or to the effect of navigating further within sub-structure 1301 in accordance with processing steps described in FIG. 11, or to the effect that user operable switch 1002 has been activated and this alternates structure display area 1001 back to image frame display area 602, the generation of the image components of which would thus incorporate any editing implemented within parameters 1303 and/or parameter data 1304.

FIG. 14

The graphical user interface 601 of application 402 is again shown in FIG. 14, wherein user 101 has selected the second plane as an image component of image frame 603 according to step 1101 and subsequently provided application 402 with navigation input data according to question 1104 in order to edit the lighting data of lighting node 709.

It was previously explained that the data processing nodes 707, 708, 709, 710 and 711 are identified at step 1101 as the sub-structure of nodes generating the second plane as an image component of image frame 603 and the tracking node 711 is selected as the ultimate processing node applied to said image component according to step 1103.

Consequently, when application 402 receives navigation input data indicating two movements "down", the effect of which in this example is to select the node 709 that is adjacent to and below the currently selected node, a graphical representation of said parameters and data specific to the functionality of the selected node 709 is provided within image data 603. Said representation includes a spotlight 1401 indicative of the type of lightmap 408 said second plane is processed with. Said representation also includes a focus area 1402 and corresponding light cone 1403 respectively depicting the focus of spotlight 1401 and the lighting energy provided thereto, within the reference three-dimensional space 1202. Finally, said representation includes a user-operable colour selector 1404 with which to intuitively select appropriate RGB colour data for said lightmap. User 101 has therefore rapidly identified the relevant data processing node and may now input selection input data according to steps 1108 and 1109, thus intuitively editing parameters and/or data to be processed by the selected lighting node 709 to improve the characteristics of the selected image component.

Thus, after a node considered appropriate to the component indicated by the user is selected, tools relevant to the selected node are displayed. Such tools could take any form. The example shown here allows intuitive editing of the selected node and thus the component, but a simple display of buttons or parameters, as will be shown in FIG. 15, would also suffice. In this example the tools serve a dual function of allowing the node to be edited but also giving a clear indication of the type of node selected and the component that it defines; thus allowing easy navigation through the process tree while keeping the display relatively simple. However other tools, for example a combination of a textual display of the node type, a toolbox or menu and a highlighting of the component that the node defines, could also be appropriate.

FIG. 15

Figure 14:
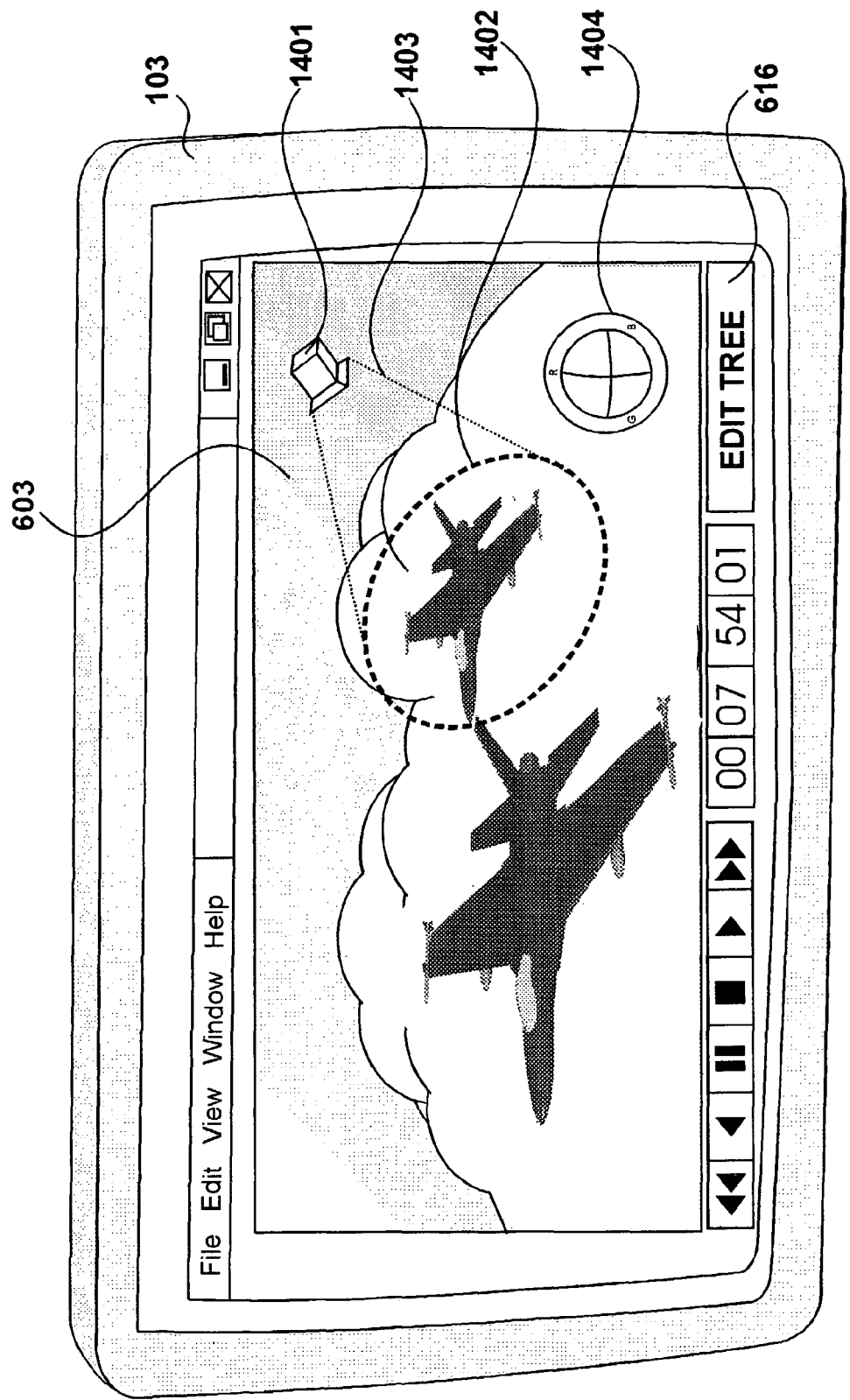
FIG. 14 shows the image frame within the graphical user interface (GUI) shown in FIG. 12, wherein navigation input data shown in FIG. 11 has been provided.
Figure 15:
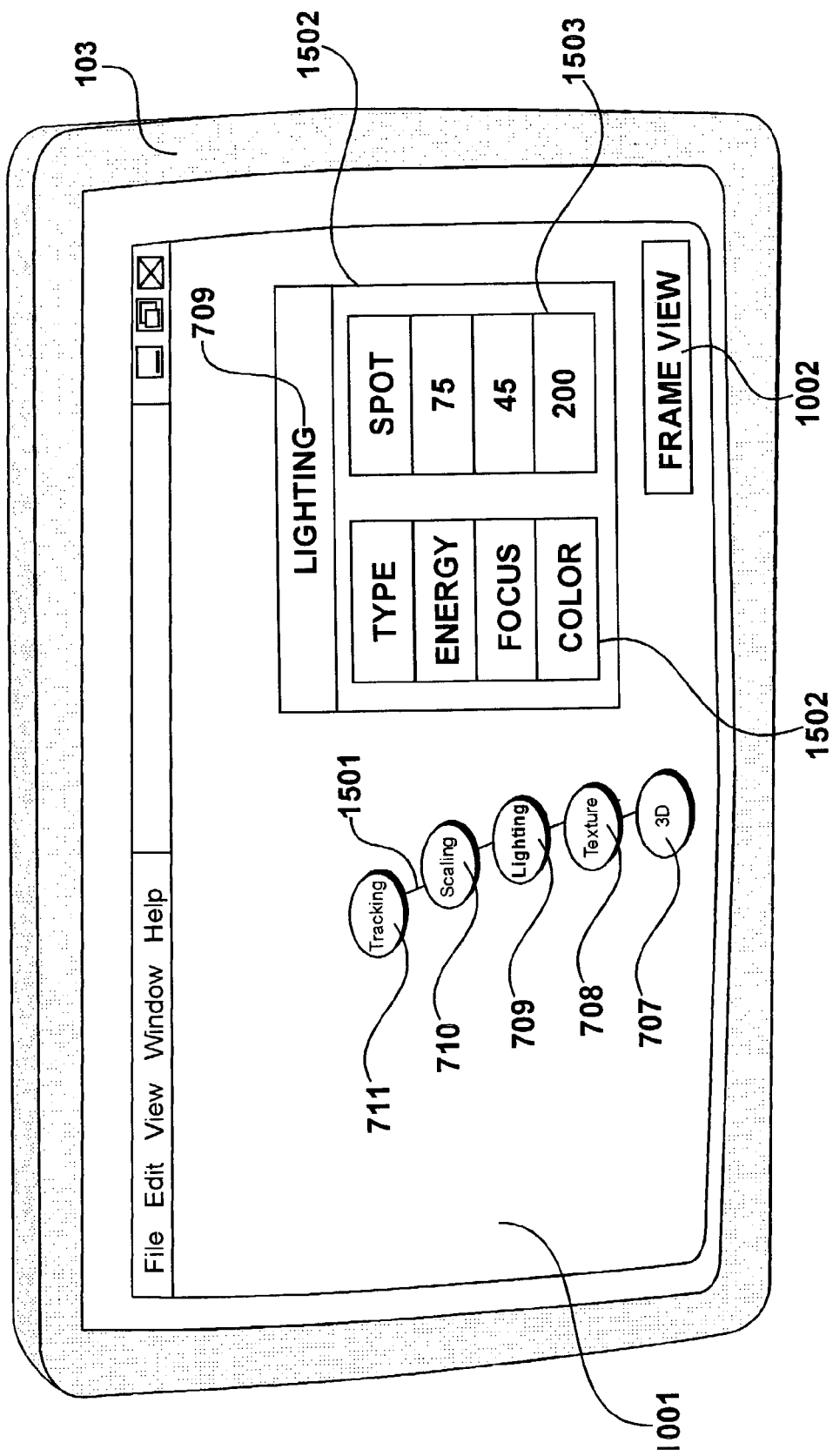
FIG. 15 shows the process tree shown in FIG. 13, wherein navigation input data shown in FIG. 11 has been provided.

The user 101 of image processing system 102 may prefer to edit the parameters and data graphically represented at 1401 to 1404 in more detail than can be perceived in FIG. 14 and thus application 402 may receive user input data 416 to the effect that the user operable switch 616 is activated such that the sub-structure of data processing nodes identified according to step 1101 is displayed within structure display area 1001. A graphical representation of the structure display area 1001 depicting the image data editing shown in FIG. 14 is shown in FIG. 15.

In the example, user 101 again selects the second plane as described in FIG. 12 but subsequently activates user operable switch 616 before inputting navigation input data according to question 1104, whereby frame display area 602 again alternates to structure display area 1001 and said user operable switch 616 alternates to user operable switch 1002. The main structure 404 is culled according to step 1122, whereby only said sub-structure is graphically displayed at 1501, which only comprises data processing nodes 707 to 711 in accordance with the example previously described.

In structure display area 1001, the selected last data processing node 711 is highlighted such that image editor 101 is immediately made aware of which type of parameters and/or data he may initiate the editing thereof according to step 1109. User 101 however wishes to edit the parameter data of lighting node 709 and thus provides application 402 with navigation input data at 1104 until such time as said data processing node 709 is highlighted. If the user switches to display 1001 after inputting the navigation data according to the question asked at step 1104, the display may automatically highlight node 709, or ignore the previous navigation, highlight node 711 as the top node as the top node of the layer and require navigation within the alternative GUI.

Application 402 again generates a parameters and data display area 1302 corresponding to said selected data processing node 709. As the processing functionality provided by said selected node differs from the processing functionality of node 711, said parameters and data display area 1302 varies to a large extent from that shown in FIG. 13. Preferably, area 1302 clearly identifies tracking node 709 by means of its corresponding node type data 405 referenced at 904, as well as its various parameters 1502 and parameter data 1503.

User 101 may input selection input data according to question 1108 within parameter data 1503, within which data corresponding to graphical representations 1401 to 1404 are shown for the purpose of clarity. Application 402 may at any time receive user input data 416 to the effect of either editing parameters 1502 or editing parameter data 1503, or to the effect of further navigating within sub-structure 1501 in accordance with processing steps described in FIGS. 11 to 14, or to the effect that user operable switch 1002 has been activated and this alternates structure display area 1001 back to image frame display area 602, the generation of the image components of which would thus incorporate any parameters or data editing implemented within parameters 1502 or parameter data 1503.

FIG. 16

Figure 16:
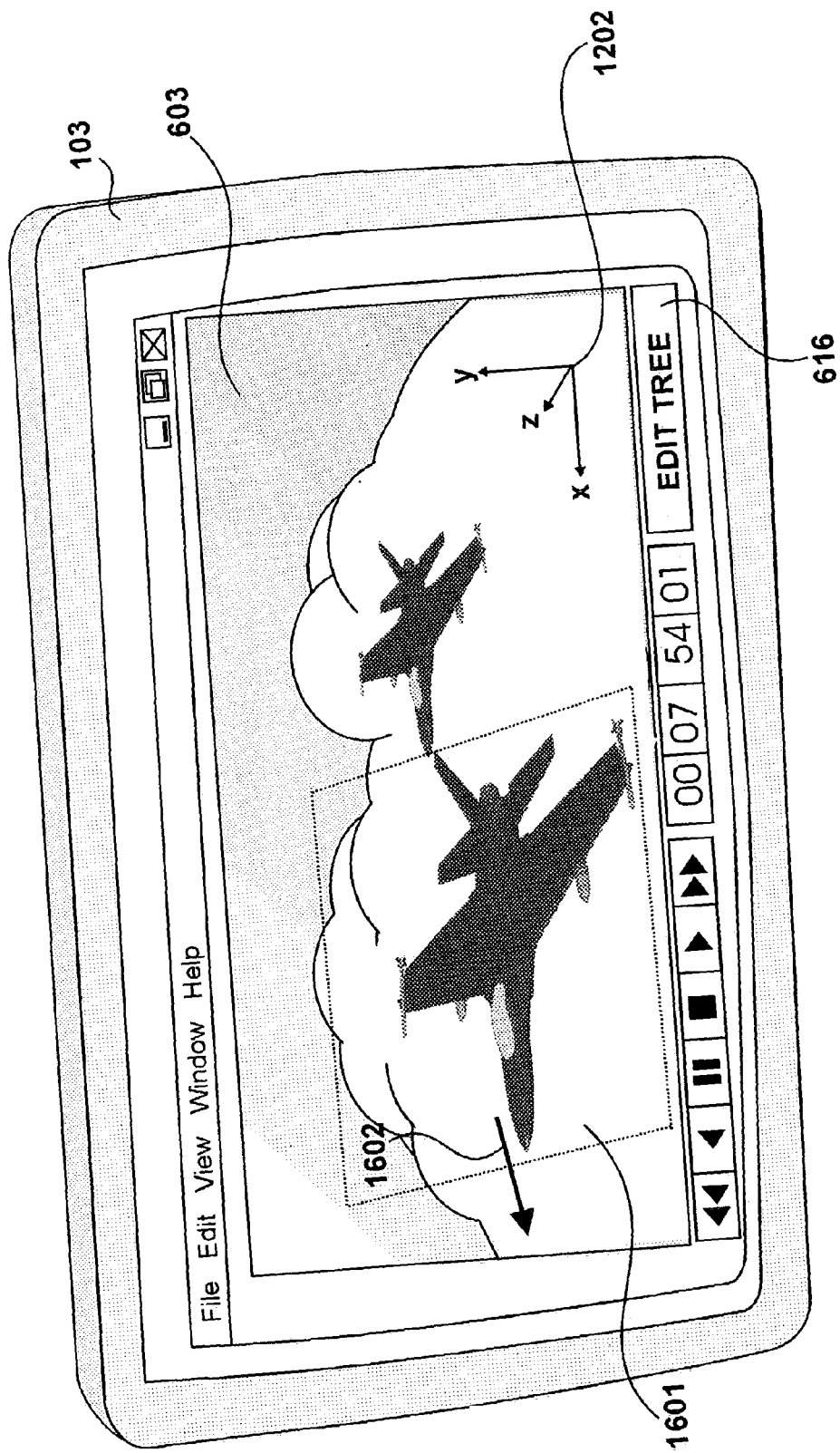
FIG. 16 shows the image frame within the graphical user interface (GUI) shown in FIGS. 12 and 14, wherein alternative navigation input data shown in FIG. 11 has been provided.

The graphical user interface 601 of application 402 is again shown in FIG. 16, wherein user 101 has selected the tracking node 706 eventually applied to frame data 801 as a sibling of tracking node 711 eventually applied to 3D model data 804.

The provision for transversal navigation allows the editor 101 to intuitively and rapidly edit the data and parameters of a plurality of data processing nodes respectively belonging to separate sub-structures, the functionality of which is comparable. In the example, editor 101 has edited parameter data 1304 processed by tracking node 711 in frame view, but now wishes to edit the similar parameter data processed by tracking node 706 to fine-tune the relative positioning between the film-based plane and the 3D-modelled plane in the output image frame. Upon accomplishing the procedural steps described in FIG. 12, the currently selected data processing node is therefore tracking node 711.

Upon inputting corresponding navigation input data 416 interpreted at question 1105 as selecting a different sub-structure, data processing node 716 is identified as the next sibling node featuring comparable data type 904 in main structure 404 to the currently selected node. Node 716 motion-tracks the 3D-modelled clouds, but editor 101 wishes to edit data pertaining to the generation of the first plane, therefore further navigation input data 416 is input to be interpreted at question 1105 as selecting a different sub-structure, whereby data processing node 706 is identified as the next sibling node featuring comparable data type 904 in main structure 404, which orientates the plane frame 801 within, the three-dimensional reference space 1202.

The representation of the functionality, parameters and data of tracking node 706 includes a two-dimensional plane 1601 encompassing the frame within said three-dimensional reference space 1202 to depict more intuitively the offset angle between the relative floor of space 1202 as defined by the x and z axes and the frame 801. Said representation also includes a vector 1602, the direction of which shows the direction of travel of the frame within said reference three-dimensional space 1202 and the length of which depicts the velocity of said frame.

Figure 17:
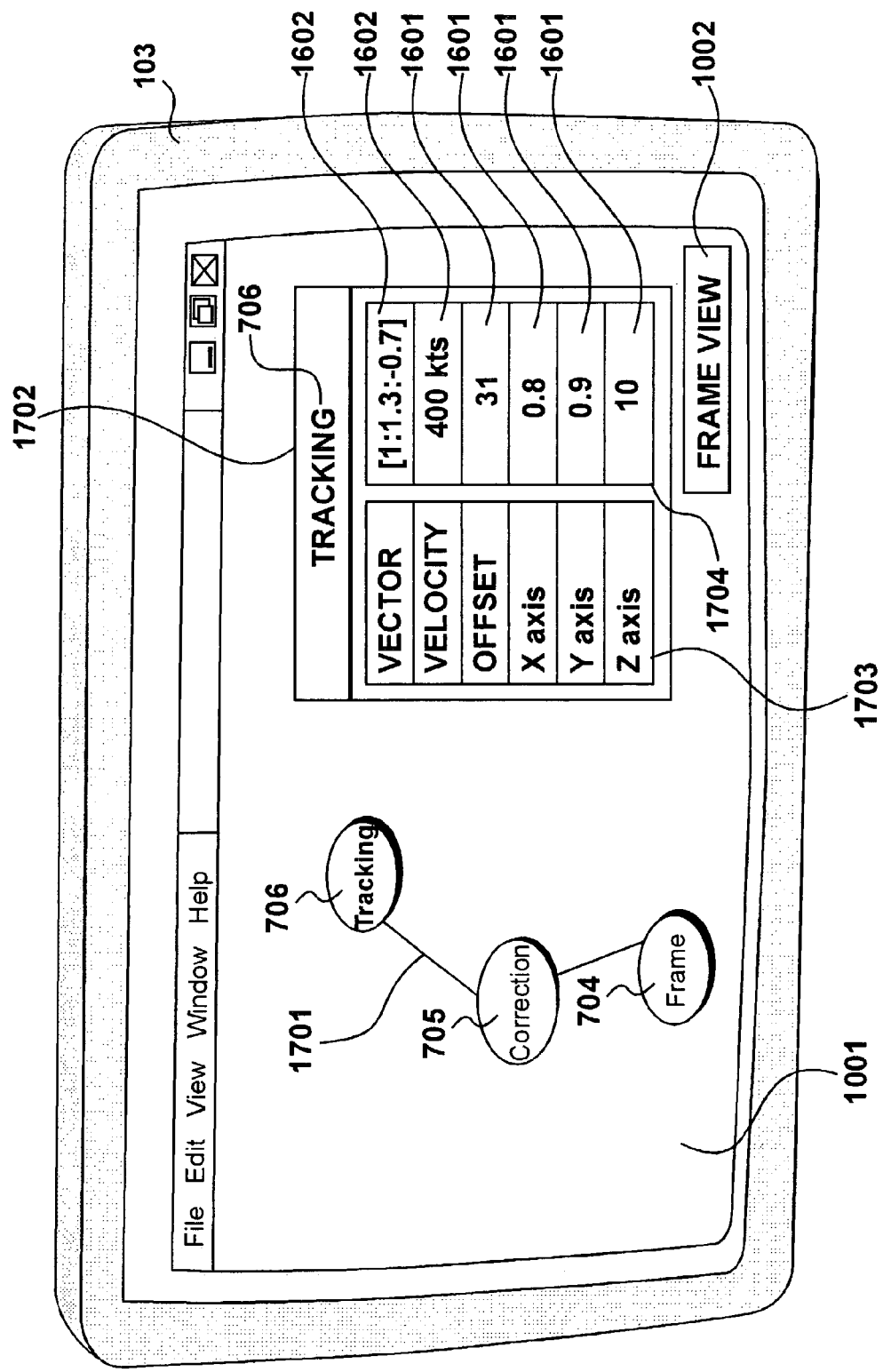
FIG. 17 shows the process tree shown in FIGS. 13 and 15, wherein alternative navigation input data shown in FIG. 11 has been provided.

Navigation user input may now be provided as an answer to question 1104, whereby parameters and data combinations 1201 to 1203 specifically relating to the functionality of tracking node 706 would be replaced by graphical representation of parameters and data combinations specific to the next data processing nodes 705 or 704, ie specific to the editing of parameters and data relating to the colour of the frame within the reference three-dimensional space 1202 or specific to the generation of a completely different frame.
FIG. 17

The user 101 of image processing system 102 may prefer to edit the parameters and data graphically represented at 1601 and 1602 in more detail than can be perceived as graphically depicted in FIG. 16 and thus application 402 may receive user input data 416 to the effect that the user operable switch 616 is activated such that the sub-structure of data processing nodes identified according to step 1101 is displayed within structure display area 1001. A graphical representation of said structure display area 1001 is shown in FIG. 17.

In the example, user 101 selects the second plane as described in FIG. 12 but subsequently activates user operable switch 616, whereby sub-structure 1301 is initially displayed as only comprising data processing nodes 707 to 711 in accordance with the example previously described in FIG. 13. However, user 101 wishes to select sibling node 706 as described in FIG. 16 and thus imparts navigation input data interpreted at question 1105 as navigating in a different sub-structure.

The main structure 404 is therefore eventually culled according to step 1122 when data processing node 706 is selected as heading the next sub-structure 1701 at step 1132, and further highlighted when selected as sibling because its data type is matched against the data type of node 711 according to step 1135. User 101 is again immediately made aware of which type of parameters and/or data he may initiate the editing thereof according to step 1109. Moreover, he is also immediately aware that edits will be performed for a different data processing node applied to a different image component, as the displayed topography of the sub-structure has changed.

Figure 18:
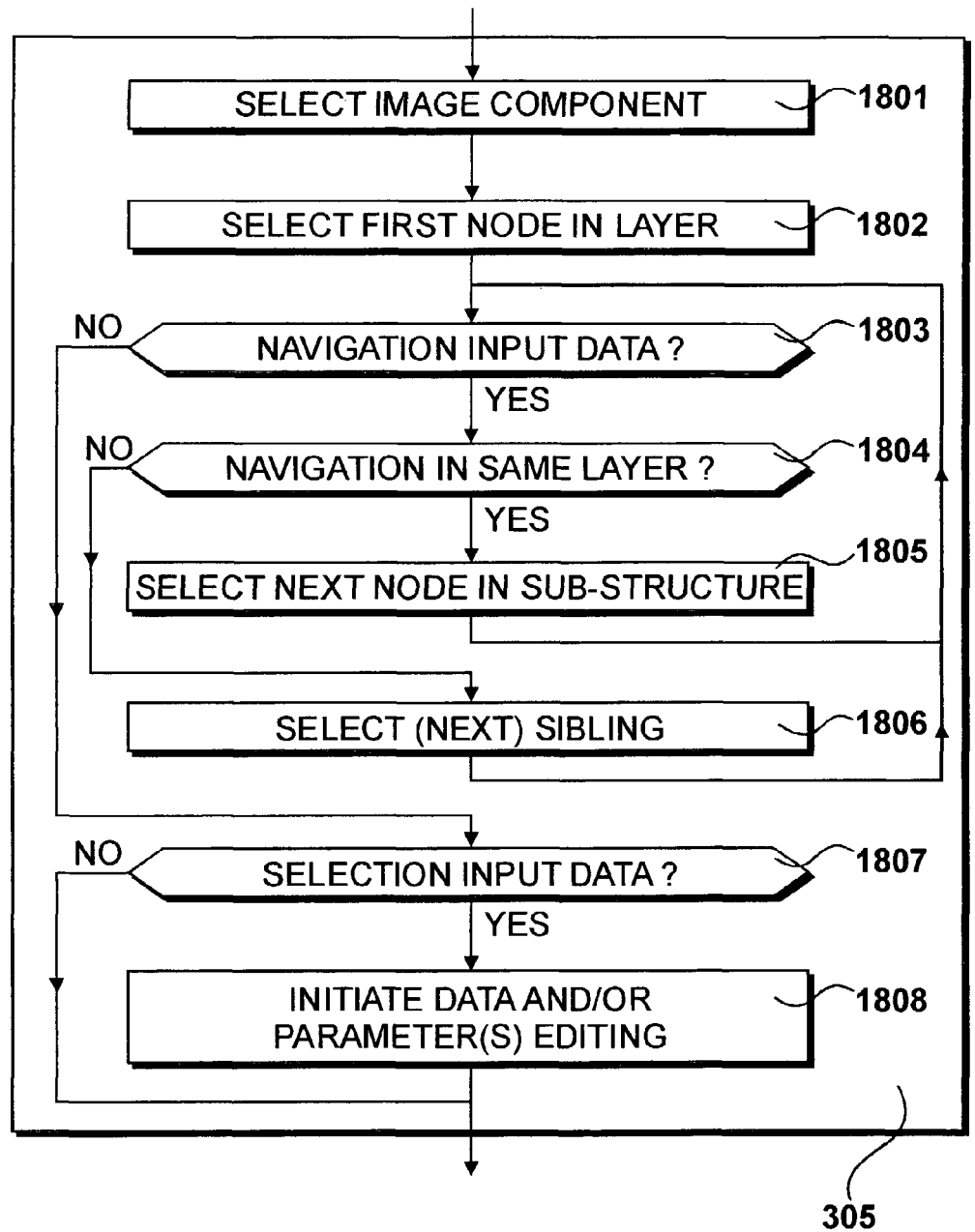
FIG. 18 shows an alternative embodiment of the navigation algorithm shown in FIG. 11.

Application 402 again generates a parameters and data display area 1702 corresponding to, said selected data processing node 706. User 101 may input selection input data according to question 1108 within parameter 1703, within which data 1704 corresponding to graphical representations 1601 and 1602 are shown for the purpose of clarity. Application 402 may at any time receive user input data 416 to the effect of either editing parameter parameters 1703 or editing parameter data 1704, or to the effect of navigating further within sub-structure 1701 in accordance with processing steps described in FIG. 11, or to the effect that user operable switch 1002 has been activated and this alternates structure display area 1001 back to image frame display area 602, the generation of the image components of which would thus incorporate any editing implemented within parameters 1703 and/or parameter data 1704.
FIG. 18.

An alternative embodiment of the algorithm shown in FIG. 11 is shown in FIG. 18. In the algorithm in FIG. 11 "sibling navigation" can mean navigating from one layer to the next between similar node types, independent of whether the nodes navigated between share the same parent. This requires identification of each layer before navigation can take place. The algorithm shown in FIG. 18 only allows sibling navigation between true siblings, that is nodes that share a parent. This makes the navigation less easy but does not require that the entire process tree be divided into sub-structures and thus simplifies the algorithm.

At step 1801 user 101 selects an image component within image frame 603 within GUI 602, for example the second plane, whereby corresponding first user input data 416 is received. The selection of the component will trigger a selection of a node within the layer defining the component. The main structure is then processed such that the top node of the layer is selected at step 1802. In the example, said top data processing node is tracking node 711. The fact that the tracking node has been selected is communicated to the user by displaying tools suitable for adjusting the tracking parameters of the selected component.

Similarly to the embodiment shown in FIG. 11, although user 101 in effect selects any one of the plurality of data processing nodes the processing of which generates said second plane within image frame 603, it is irrelevant which specific data processing node within the sub-structure is selected, since application 402 eventually selects the top data processing node. However the method of selecting the node differs, as will be described further below with reference to FIG. 18*a*.

A question is asked at the next step 1803 as to whether navigation input data has been received, i.e. whether application 402 has received further user input data 416 indicative of a decision that the currently selected data processing node 711 is not the data processing node required for editing.

If the question of step 1803 is answered in the affirmative, a second question is asked at step 1804 as to whether the navigation input data received corresponds to linear navigating amongst parent and children nodes. If this question is answered in the affirmative, the next data processing node in the sub-structure identified at step 502 is selected at step 1805. A representation of the selected node is displayed to the user. Control is then returned to step 1803.

Alternatively, the question asked at step 1804 is answered in the negative, to the effect that the navigation input data corresponds to transversal navigating amongst siblings. The user would input this data when he wishes to edit nodes referring to a different component. In this case a sibling is selected at step 1806 and control returned to question 1803, such that navigation within the different layer now selected is now possible. Again a representation of the selected node is displayed.

When the question asked at step 1803 is eventually answered in the negative, a third question is asked at step 1807 as to whether application 402 has received selection input data. Said selection input data is again user input data 416 but differs from the navigation input data of question 1803 in that it is processed by application 402 for updating application data 406 to 411 to be processed by the data processing node selected at step 502. Question 1807 is only answered in the affirmative if said input data differs from the pre-set navigation input data of questions 1803, e.g. input data read at question 1807 differs from the keystroke or mouse click input to effect navigation at question 1803.

Thus, when question 1807 is answered in the affirmative, the editing of parameters and/or data is initiated at step 1808 for the currently selected data processing node, and the edited image data may eventually be stored. Alternatively, question 1807 is answered in the negative whereby the edited image data may immediately be stored.

FIG. 18a

Figure 18A:
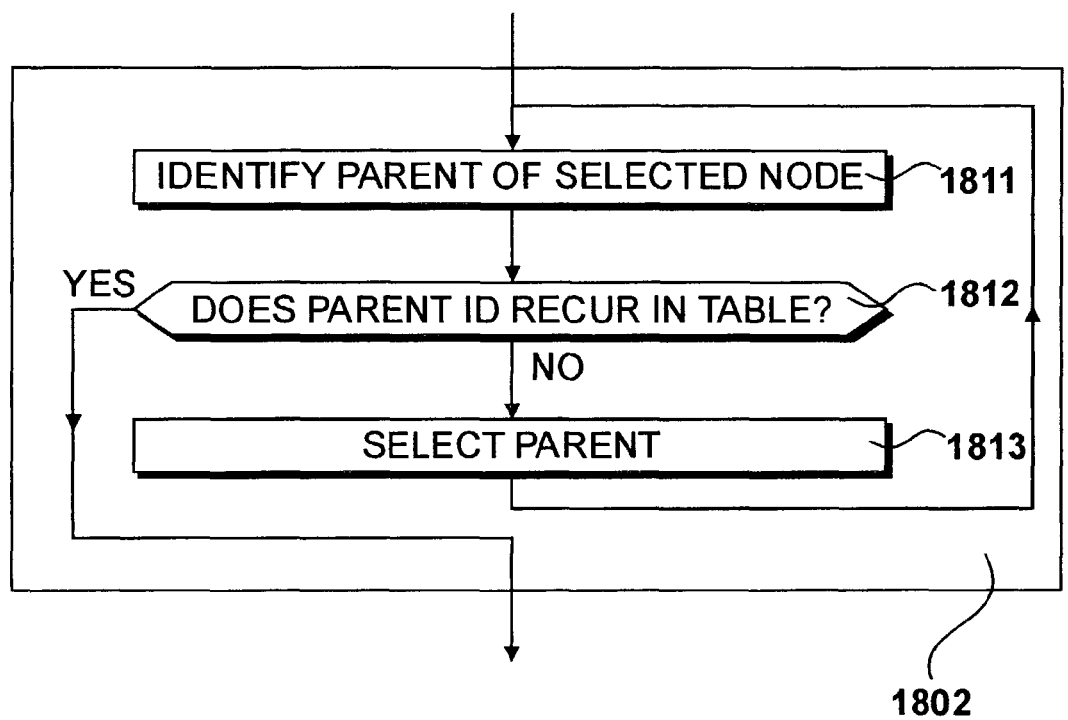
FIG. 18a details steps carried out in FIG. 18 to select a top node.

FIG. 18a details steps carried out at step 1802 to select the first node in the layer defining the image component selected by the user at step 1801. In this algorithm the layers are not specifically identified, but the top node of a layer is discovered by finding the closest node above the node identified at step 1801 that has the same parent node as at least one other node, ie that starts a new layer. This identifies the layer that defines the identified component. Again, in other embodiments it could be a different node in the layer that is selected. This algorithm can easily be adapted to find, for example, a bottom node (a node without children), the last node before the start of another layer (a node with more than one child) and so on.

At step 1811 the parent of the selected node is identified and at step 1812 a question is asked as to whether the parent node's ID 901 recurs in the table shown in FIG. 9. If this question is answered in the affirmative then the selected node is in fact the top node of a layer and step 1802 is complete. If it is answered in the negative then the parent is selected at step 1813 and control is returned to step 1811, at which the next parent is identified. In this way the top node of the layer is ultimately selected.

FIG. 18b

Figure 18B:
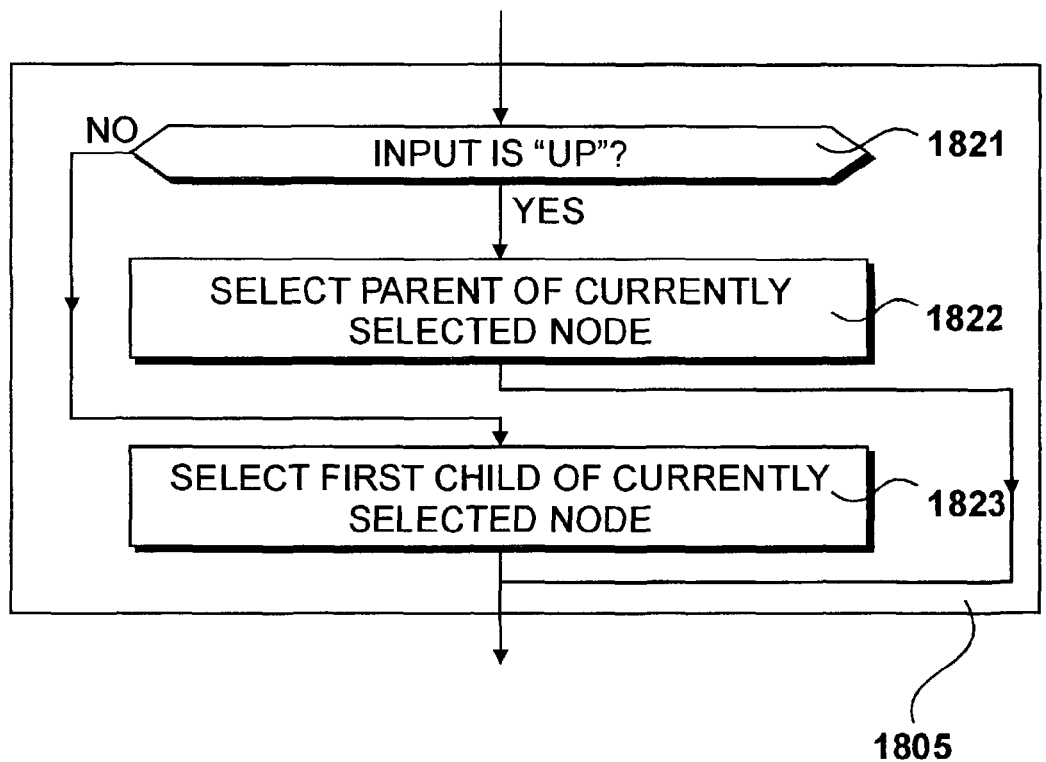
FIG. 18b details steps carried out in FIG. 18 to perform vertical navigation.

FIG. 18b details steps carried out at step 1805 to select the next node in the sub-structure when, vertical navigation within a layer is indicated by the user input data. Exactly which node is selected depends upon whether the navigation input indicates "up" or "down": "up" navigation will select the parent of the currently selected node, and "down" navigation will select a child of the currently selected node.

Hence at step 1821 a question is asked as to whether the navigation input indicated "up" navigation. If this question is answered in the affirmative then the parent of the currently selected node is selected at step 1822. If it is answered in the negative, to the effect that the navigation is "down", then the first child of the node is selected at step 1823.

FIG. 18c

Figure 18C:
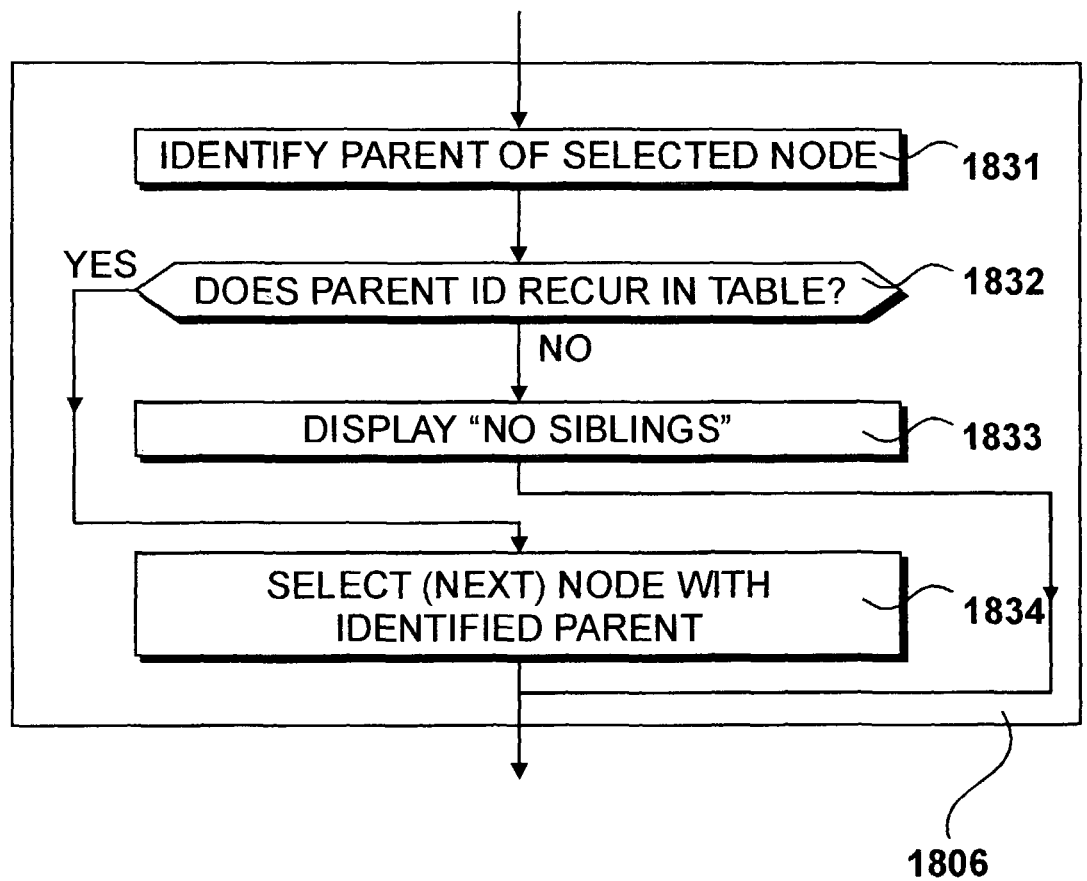
FIG. 18c details steps carried out in FIG. 18 to perform horizontal navigation.

FIG. 18c details steps carried out at step 1806 to select a sibling if the user input data indicates transversal or horizontal navigation. At step 1831 the parent of the currently selected node is identified and at step 1832 a question is asked as to whether the parent node's ID 901 recurs in the table shown in FIG. 9. If this question is answered in the negative then the message "NO SIBLINGS" is displayed to the user at step 1833, to indicate that transversal navigation is not currently possible since the node does not have any true siblings. If it is answered in the affirmative then the next node that has the same parent is selected at step 1834. In either case step 1806 is completed and control returns to step 1803 to await further input. If the sibling selected is not the one required by the user then further user input data indicating transversal navigation will cycle through the siblings until the one required is selected.

The two embodiments herein described are not exhaustive of the examples of algorithms that could be used to embody the present invention. The skilled reader will appreciate that any method of selecting a node relevant to a user-selected component and displaying editing tools relevant to that node would be suitable.

In view of the above, one or more embodiments of the invention provide an apparatus, method, and computer-readable medium configured to process image data. The computer-readable medium comprises a computer program storage device storing instructions that when read and executed by a computer, results in the computer performing a method for processing image data.

The invention claimed is:

1. Apparatus for processing image data comprising processing means, input means and display means, wherein said image data is defined by a plurality of data processing nodes arranged in a hierarchical structure and said processing means is configured to perform the steps of:
    generating a first two-dimensional (2D) image frame of a clip of image frames, wherein a plurality of image components makes up the first image frame, by means of processing said plurality of data processing nodes;
    outputting said first image frame to said display means;
    receiving, via said input means, first 2D user input data indicating one of said plurality of image components, wherein said first 2D user input data comprises x, y coordinate input data;
    in response to said receiving, automatically selecting a first data processing node used to generate said indicated image component; and
    displaying editing tools relevant to said first data processing node.

2. Apparatus according to claim 1, wherein said first data processing node is in a sub-structure of said hierarchical structure that defines said image component.

3. Apparatus according to claim 2, wherein said sub-structure is a layer, wherein a layer is defined as a connected collection of nodes having at the top a node that has the same parent node as at least one other node.

4. Apparatus according to claim 3, wherein said processing means selects said first data processing node by performing the following steps:
    identifying one of the plurality of data processing nodes that defines said image component;
    defining a plurality of layers within said hierarchical structure by identifying nodes with a plurality of children nodes;
    identifying the layer that includes said identified data processing node; and
    selecting the top node of said identified layer.

5. Apparatus according to claim 3, wherein said processing means selects said first data processing node by performing the following steps:
    identifying one of the plurality of data processing nodes that defines said image component;
    defining a plurality of layers within said hierarchical structure by identifying nodes with a plurality of children nodes;
    identifying the layer that includes said identified data processing node; and
    selecting a bottom node of said identified layer.

6. Apparatus according to claim 3, wherein said processing means selects said first data processing node by performing the following steps:
    identifying one of the plurality of data processing nodes that defines said image component;
    selecting the closest node above said identified node that has the same parent node as at least one other node.

7. Apparatus according to claim 1, wherein in response to first further user input data said processing means performs the following steps:
    selecting a portion of said hierarchical structure that is considered appropriate to said selected image component and contains said first data processing node;
    generating third image data comprising a depiction of said portion; and
    outputting said third image data to said display means.

8. Apparatus according to claim 7, wherein said third image data further includes a display of parameters relating to said first data processing node.

9. Apparatus according to claim 7, wherein said portion of said hierarchical structure is a layer, wherein a layer is defined as a connected collection of nodes having at the top a node that has the same parent node as at least one other node.

10. Apparatus according to claim 1, wherein in response to second further user input data indicating navigation through said hierarchical structure said processing means performs the following steps:
- selecting a second data processing node;
- generating a fourth image frame comprising said plurality of image components and tools relevant to said second data processing node; and
- outputting said fourth image frame to said display means.

11. Apparatus according to claim 10, wherein said second data processing node is connected in said hierarchical structure to said first data processing node if said further user input data indicates vertical navigation.

12. Apparatus according to claim 10, wherein said second data processing node has the same parent node as said first data processing node if said further user input data indicates horizontal navigation.

13. Apparatus according to claim 10, wherein said second data processing node is of a comparable data type to said first data processing node but defines a different one of said plurality of image components from said indicated image component if said further user input data indicates horizontal navigation.

14. A method of processing image data, wherein:
- a two-dimensional (2D) image frame of a clip of image frames, wherein a plurality of image components makes up the image frame, and wherein said image frame is generated by processing a plurality of data processing nodes arranged in a hierarchical structure;
- said image frame is displayed to a user;
- said user manually selects one of said plurality of image components for adjusting, wherein said manual selection comprises x, y coordinate input data;
- in response to said selecting, a first data processing node used to generate said image component is automatically selected; and
- editing tools relevant to said first data processing node are displayed to said user.

15. A method according to claim 14, wherein said first data processing node is in a sub-structure of said hierarchical structure that defines said image component.

16. A method according to claim 15, wherein said sub-structure is a layer, wherein a layer is defined as a connected collection of nodes having at the top a node that has the same parent node as at least one other node.

17. A method according to claim 16, wherein said step of selecting said first data processing node comprises the following steps of:
- identifying one of the plurality of data processing nodes that defines said image component;
- defining a plurality of layers within said hierarchical structure by identifying nodes with a plurality of children nodes;
- identifying the layer that includes said identified data processing node; and
- selecting the top node of said identified layer.

18. A method according to claim 16, wherein said step of selecting said first data processing node comprises the following steps:
- identifying one of the of data processing nodes that defines said image component;
- defining a plurality of layers within said hierarchical structure by identifying nodes with a plurality of children nodes;
- identifying the layer that includes said identified data processing node; and
- selecting a bottom node of said identified layer.

19. A method according to claim 14, wherein said step of selecting said first data processing node comprises the following steps:
- identifying one of the plurality of data processing nodes that defines said image component;
- selecting the closest node above said identified node that has the same parent node as at least one other node.

20. A method according to claim 14, wherein in response to further manual input a portion of said hierarchical structure that is considered appropriate to said selected image component and contains said first data processing node is displayed to said user.

21. A method according to claim 20, wherein a display of parameters relating to said first data processing node is additionally displayed to said user.

22. A method according to claim 20, wherein said portion of said hierarchical structure is a layer, wherein a layer is defined as a connected collection of nodes having at the top a node that has the same parent node as at least one other node.

23. A method according to claim 14, wherein
- said user manually selects a direction for navigation through said hierarchical structure;
- a second data processing node is selected in response to said direction; and
- editing tools relevant to said first data processing node are displayed to said user.

24. A method according to claim 23, wherein if said direction for navigation is vertical then said second data processing node is connected in said hierarchical structure to said first data processing node.

25. A method according to claim 23, wherein if said direction for navigation is horizontal then second data processing node is of a comparable data type to said first data processing node but defines, a different one of said plurality of image components from said indicated image component.

26. A method according to claim 23, wherein if said direction for navigation is horizontal then said second data processing node has the same parent node as said first data processing node.

27. In a computer system having a graphical user interface including a display and a user interface selection device, a method of processing image data, wherein
- a two-dimensional (2D) image frame of a clip of image frames, wherein a plurality of image components makes up the image frame, and wherein the image frame is generated by processing a plurality of data processing nodes arranged in a hierarchical structure;
- said image frame is displayed to a user by means of said display;
- said system responds to manual operation of said user interface selection device when said user manually selects one of said plurality of image components for adjusting by inputting x, y coordinate input data;
- in response to said manual selection, said system automatically identifies a first data processing node used to generate the image component that has been selected; and
- said system updates said graphical user interface to present editing tools relevant to said first data processing node.

28. A method according to claim 27, wherein said step of selecting said first data processing node comprises the steps of
- identifying one of the plurality of data processing nodes that define said image component;
- defining a plurality of layers within said hierarchical structure by identifying nodes with a plurality of subordinate nodes;
- identifying the layer that includes said identified data processing node; and
- selecting the top node of said identified layer.

29. A method according to claim 27, wherein
- said user manually selects a direction for navigation through said hierarchical structure using said user interface selection device;
- a second data processing node is selected in response to said editing tools relevant to said first data processing nodes are displayed to said user via said graphical user interface.

30. A method according to claim 29, wherein movement of said interface selection device in a first direction results in the second data processing node being connected in said hierarchical structure to said first processing node, and movement in an alternative direction results in said second data processing node being selected that is of a comparable data type to said first data processing node but defines a different one of said plurality of image components.

31. A computer-readable medium comprising a computer program storage device storing instructions that when read and executed by a computer, results in the computer performing a method for processing image data, the method comprising:
- generating a two-dimensional (2D) image frame of a clip of image frames, wherein a plurality of image components makes up the image frame, by processing a plurality of data processing nodes arranged in a hierarchical structure;
- displaying said image frame to a user;
- responding to a user's manual selection of one of said plurality of image components for adjustment, wherein said manual selection comprises x, y coordinate input data;
- in response to said selection, automatically identifying a first data processing node used to generate said image component that has been selected; and
- presenting editing tools relevant to said first data processing node to said user.

32. A computer-readable medium having computer-readable instructions according to claim 31, such that when executing said instructions a computer will also perform the steps of:
- identifying one of the plurality of data processing nodes that define said image component;
- defining a plurality of layers within said hierarchical structure by identifying nodes with a plurality of subordinate nodes;
- identifying a layer that includes said identified data processing node; and
- selecting the top node of said identified layer.

* * * * *